(12) United States Patent
Kinjo et al.

(10) Patent No.: US 7,127,108 B2
(45) Date of Patent: Oct. 24, 2006

(54) IMAGE PROCESSING METHOD

(75) Inventors: Naoto Kinjo, Ashigarakami-gun (JP); Naoki Takaoka, Ashigarakami-gun (JP); Jun Enomoto, Ashigarakami-gun (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 359 days.

(21) Appl. No.: 10/295,940

(22) Filed: Nov. 18, 2002

(65) Prior Publication Data

US 2003/0068084 A1    Apr. 10, 2003

Related U.S. Application Data

(62) Division of application No. 09/321,614, filed on May 28, 1999, now Pat. No. 6,631,208.

(30) Foreign Application Priority Data

| May 29, 1998 | (JP) | .................................. 10-149555 |
| Jun. 15, 1998 | (JP) | .................................. 10-166973 |

(51) Int. Cl.
    *G06K 9/46*    (2006.01)

(52) U.S. Cl. ..................... 382/203; 382/254

(58) Field of Classification Search ........ 382/203–204, 382/195, 254, 162–167; 358/203–204, 162–167, 358/195, 254

See application file for complete search history.

(56) References Cited

U.S. PATENT DOCUMENTS 5,130,789 A * 7/1992 Dobbs et al. ............... 358/500
5,990,973 A * 11/1999 Sakamoto .................. 348/576
6,204,858 B1 * 3/2001 Gupta ........................ 345/600
6,292,574 B1 * 9/2001 Schildkraut et al. ........ 382/117

FOREIGN PATENT DOCUMENTS

| JP | 7-72537 A | 3/1995 |
| JP | 9-261580 A | 10/1997 |
| JP | 10-75374 A | 3/1998 |

* cited by examiner

*Primary Examiner*—Thomas D. Lee
*Assistant Examiner*—Stephen Brinich
(74) *Attorney, Agent, or Firm*—Birch, Stewart, Kolasch & Birch, LLP

(57) ABSTRACT

Each crest-shape distribution region is sectioned in accordance with a value of a color obtained from extracted elements such as hue, saturation and lightness. A characteristic amount at each of a plurality of positions of an image including a designated eye is calculated, on the basis of values of obtained characteristic amounts, an image of a pupil portion is extracted, and red-eye correction processing is carried out.

15 Claims, 17 Drawing Sheets

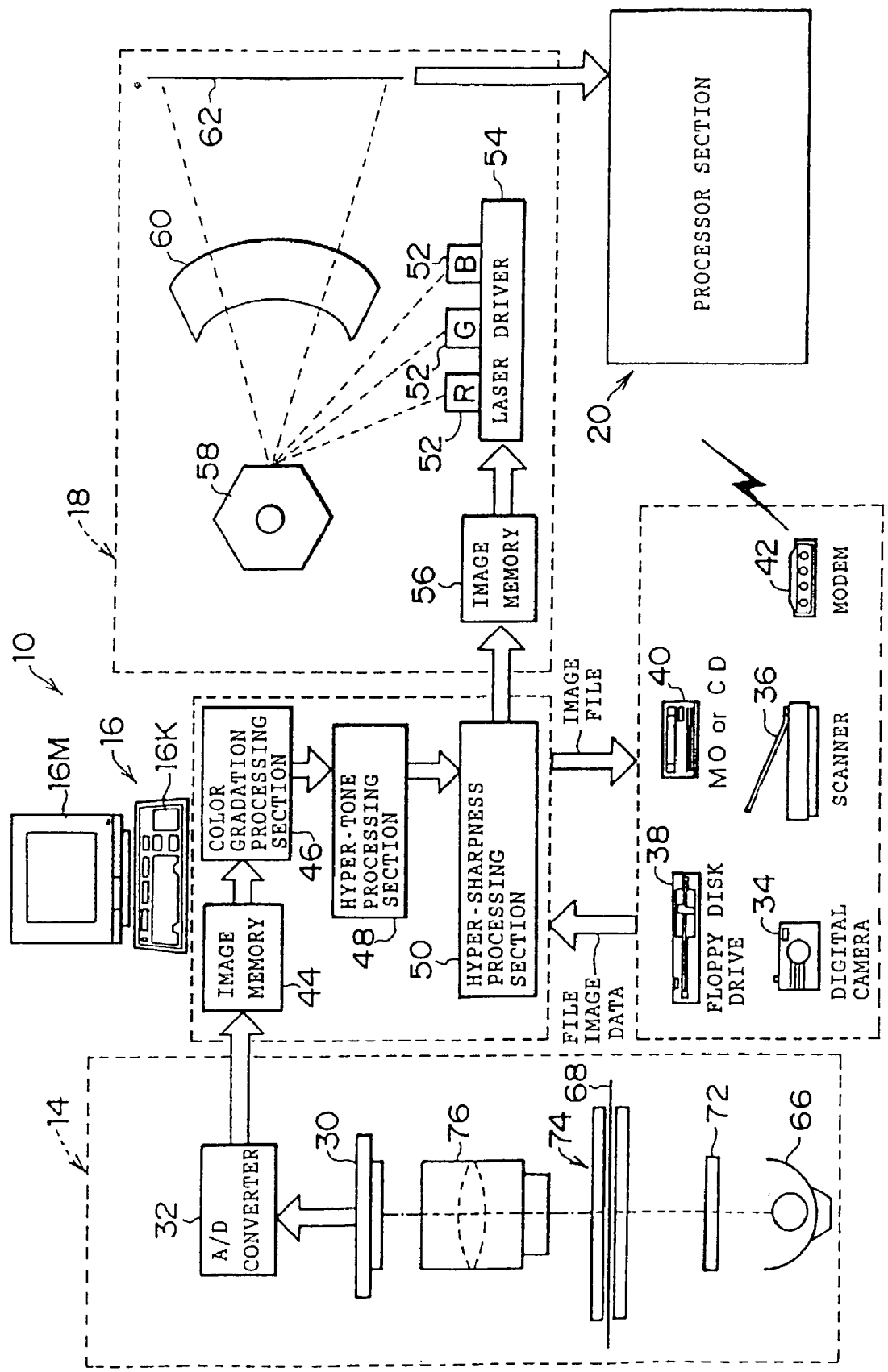

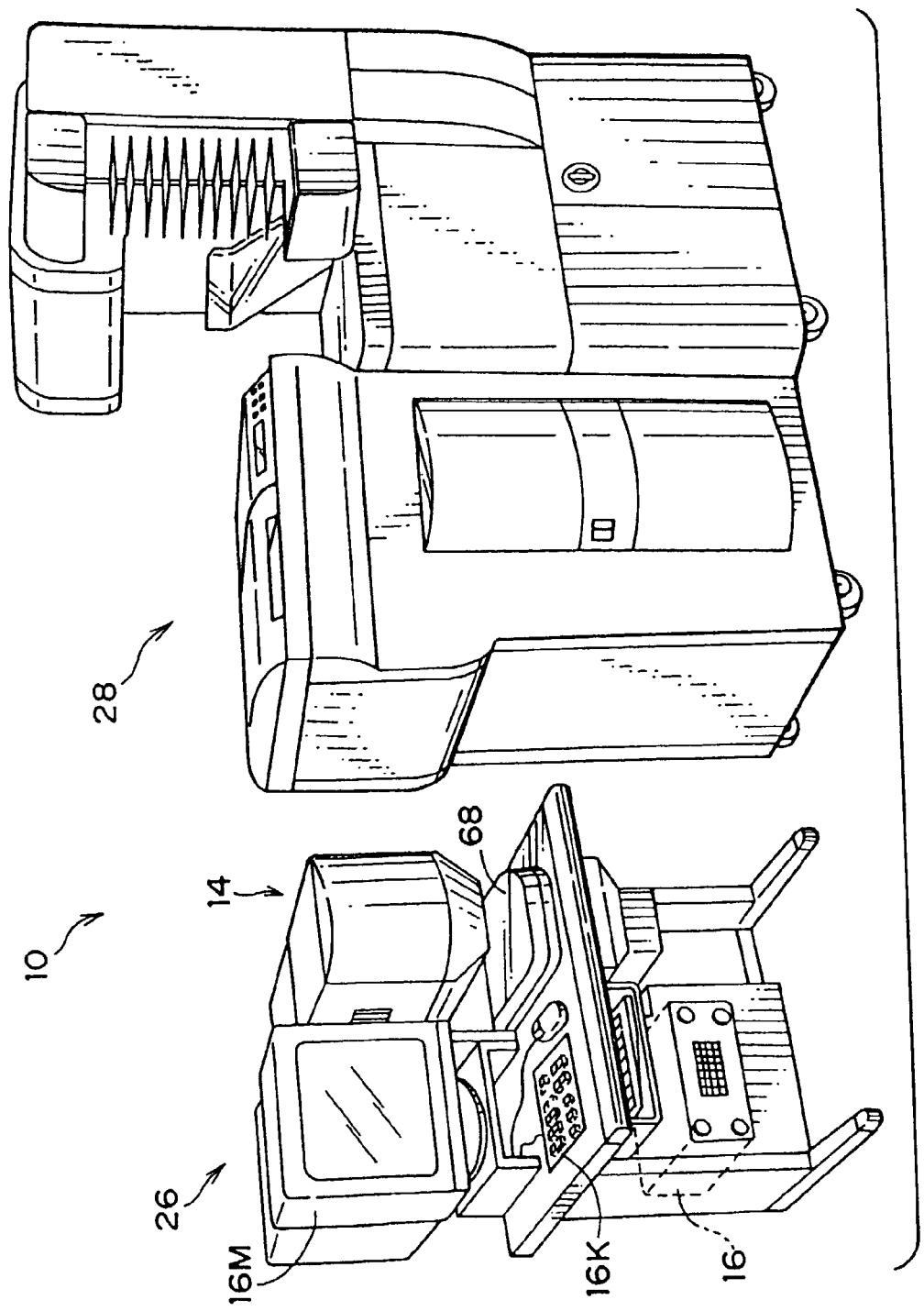

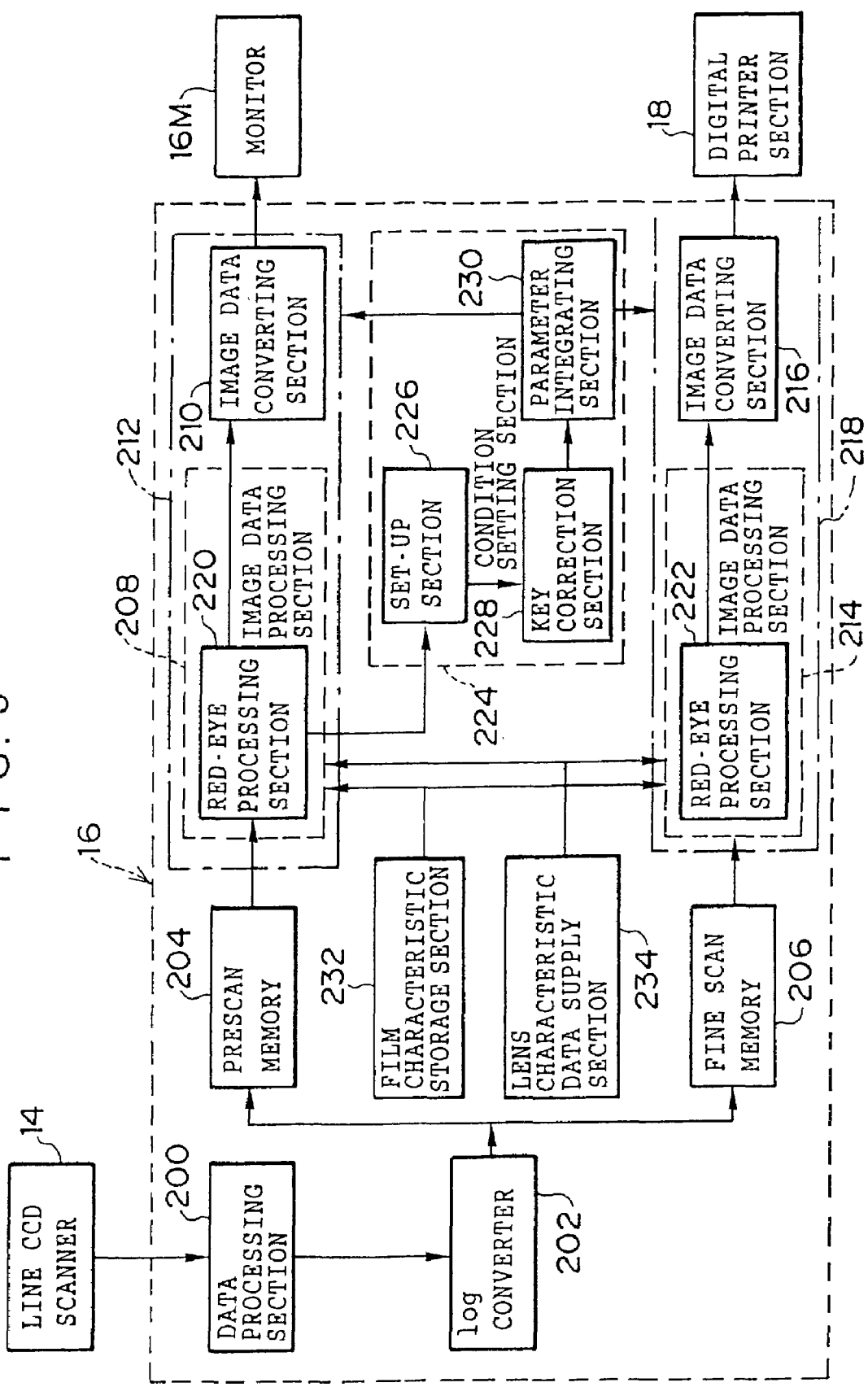

F I G. 8
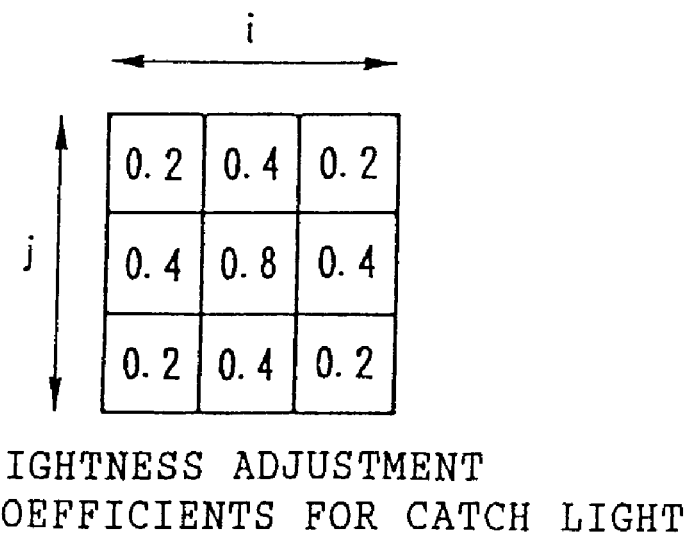
LIGHTNESS ADJUSTMENT
COEFFICIENTS FOR CATCH LIGHT
F I G. 9
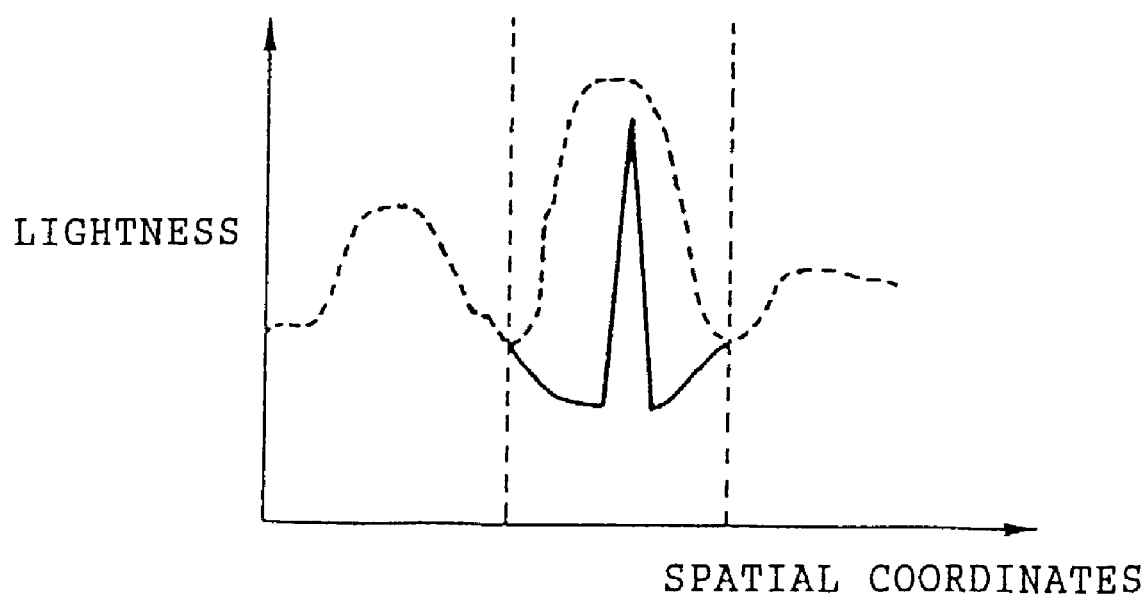

CHARACTERISTIC AMOUNT A

0

CHARACTERISTIC AMOUNT B

0

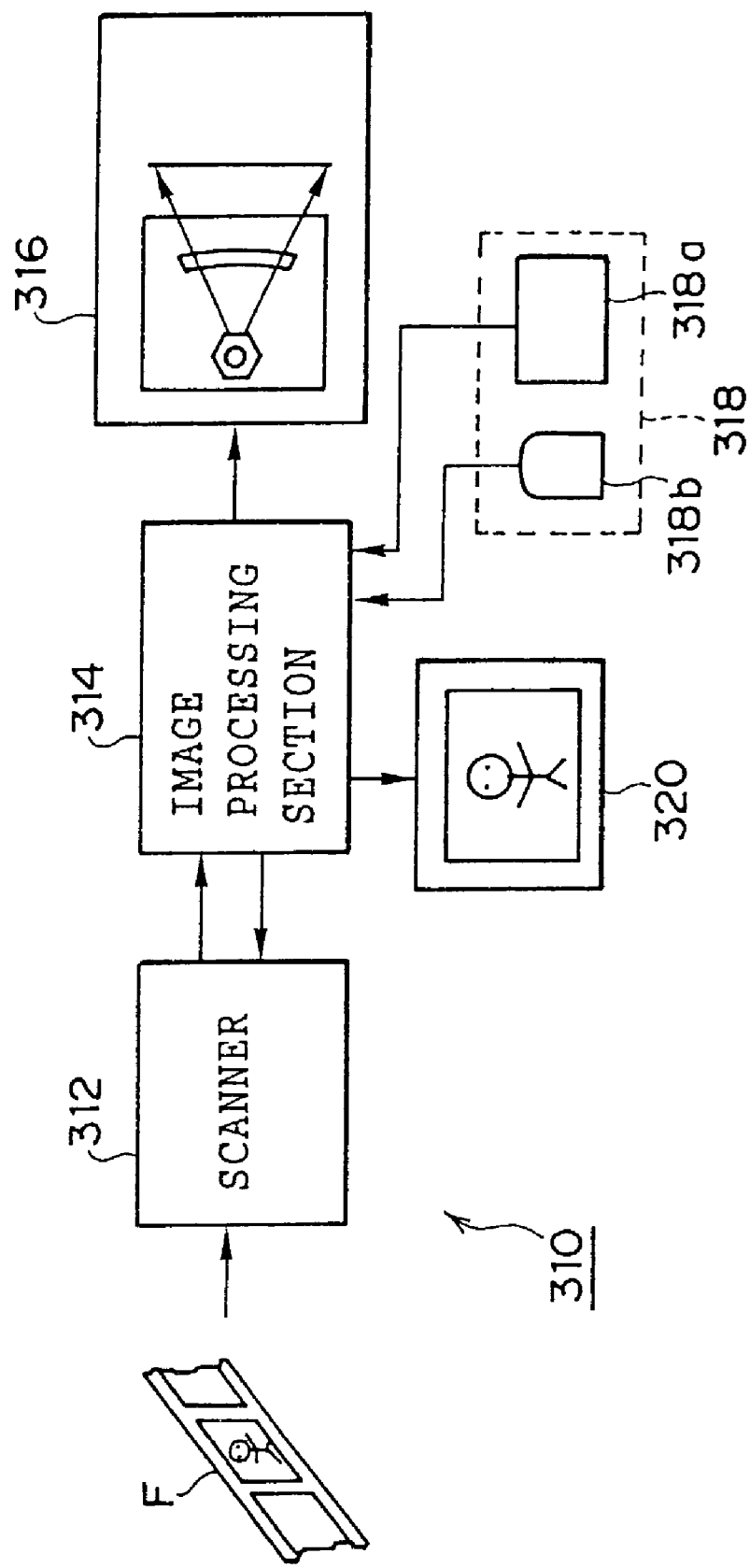

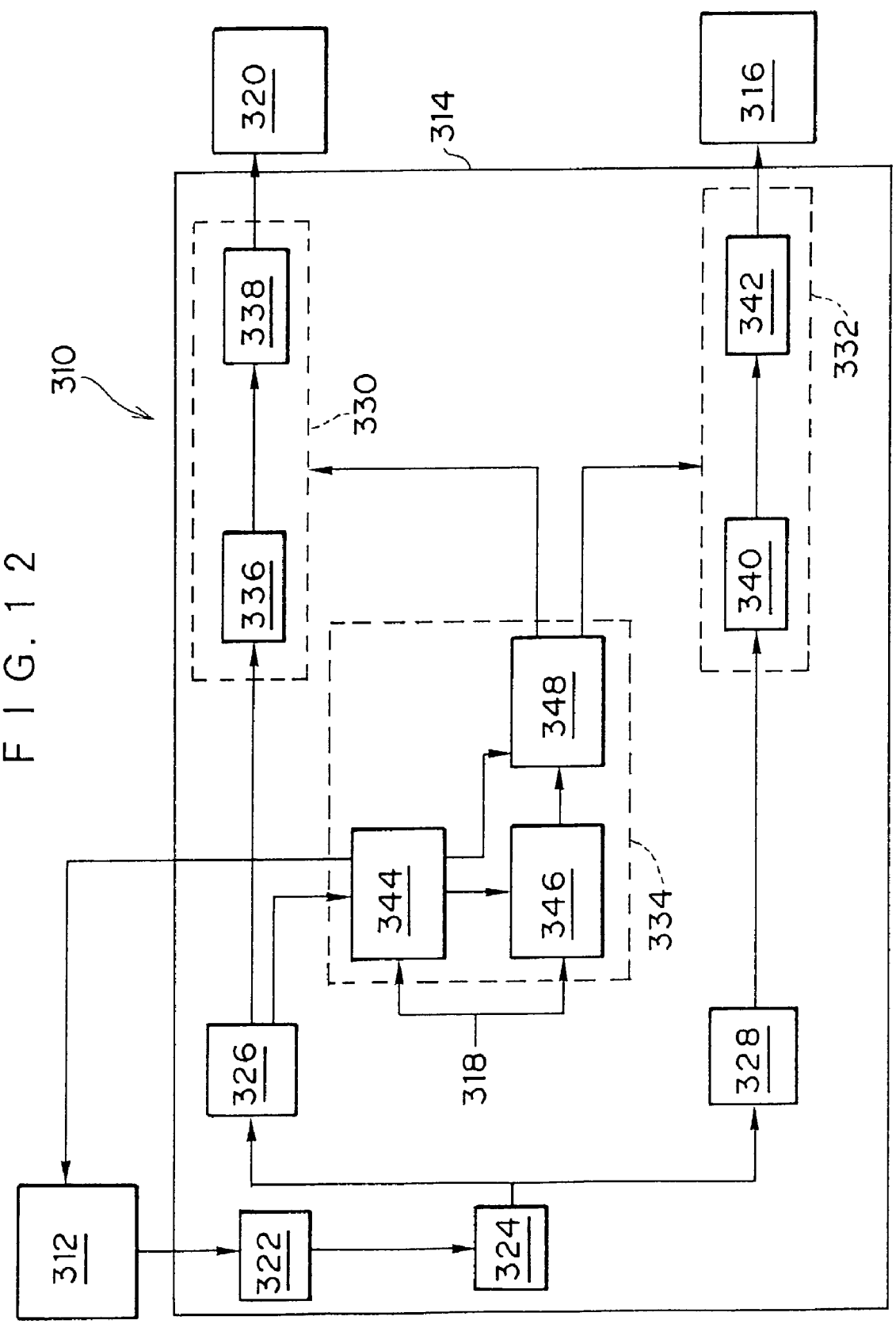

F I G. 1 3
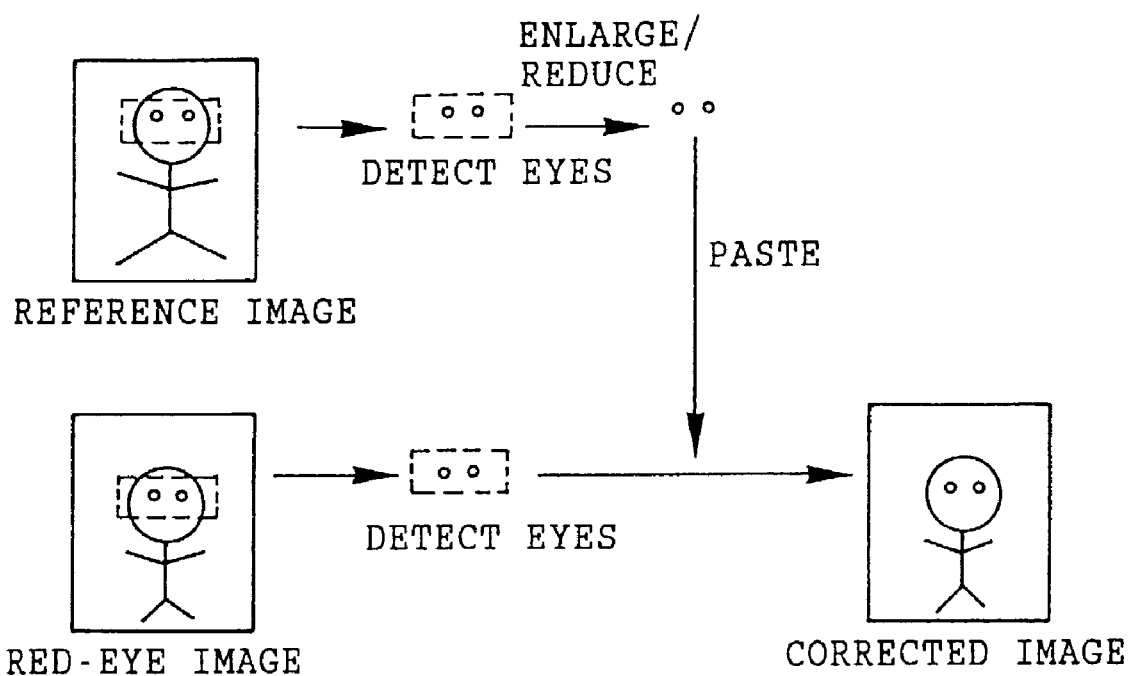
F I G. 1 4
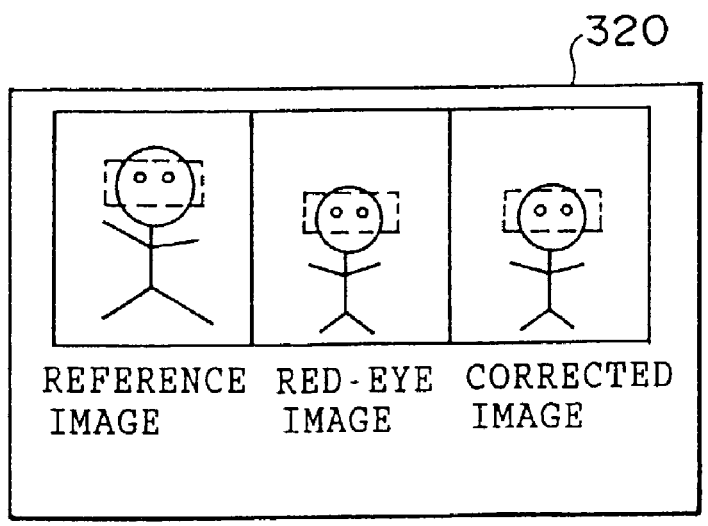

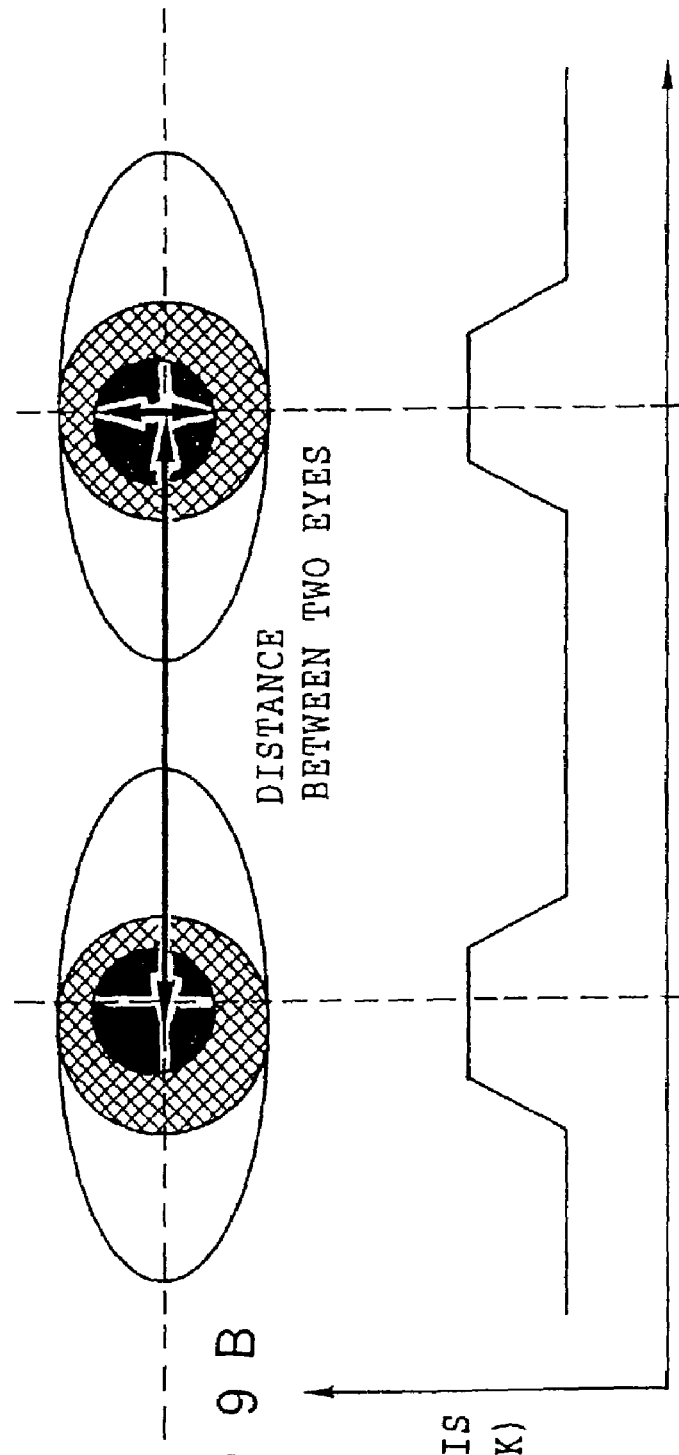

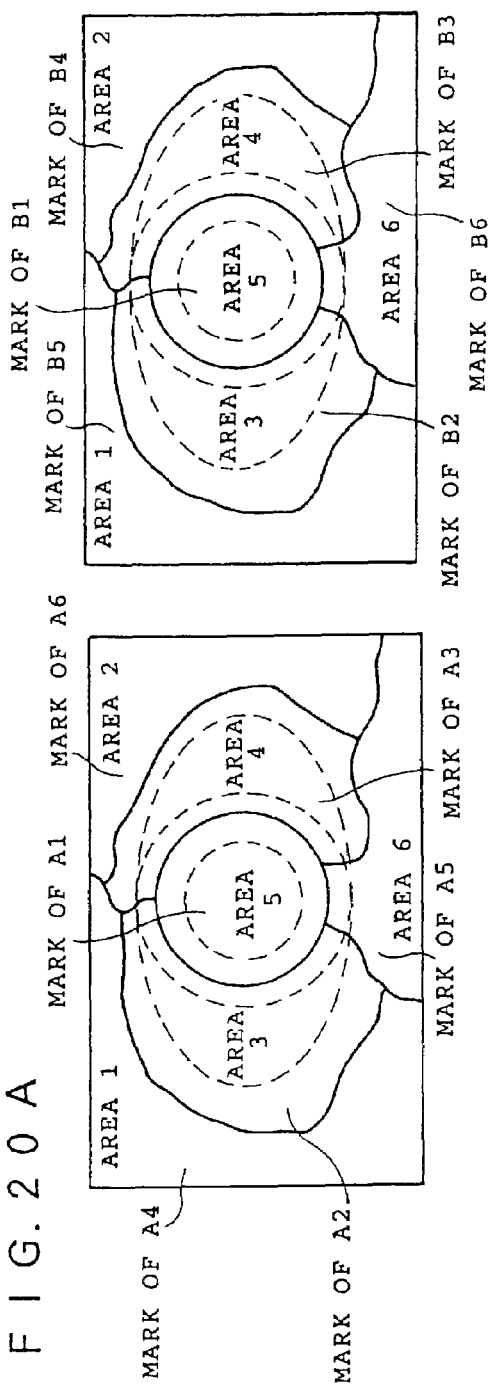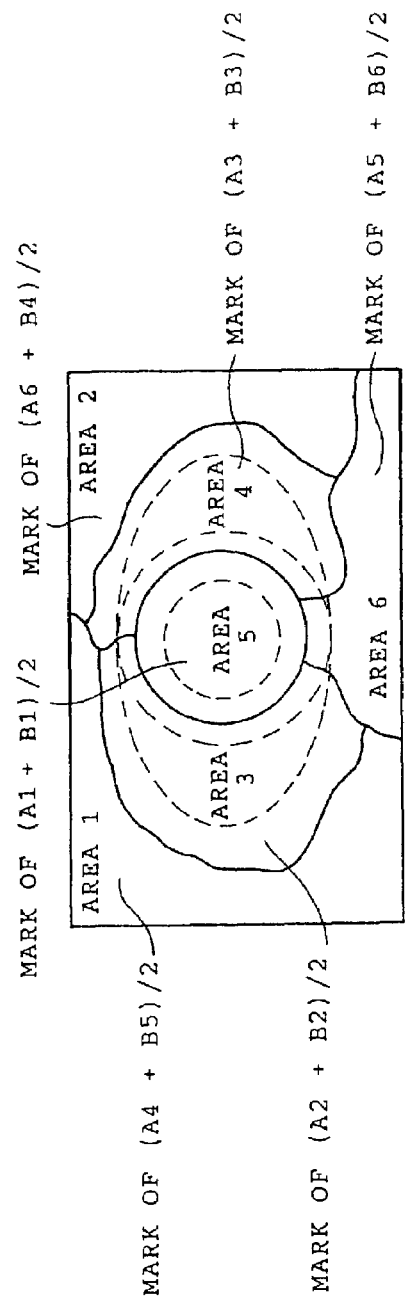
FIG. 20A
FIG. 20B

IMAGE PROCESSING METHOD

This application is a divisional of application Ser. No. 09/321,614, filed on May 28, 1999 now U.S. Pat. No. 6,631,208, the entire contents of which are hereby incorporated by reference and for which priority is claimed under 35 U.S.C. § 120; and this application claims priority of application Ser. Nos. 10-149555 filed in Japan on May 29, 1998 and 10-166973 filed in Japan on Jun. 15, 1998 under 35 U.S.C. § 119.

BACKGROUND OF THE INVENTION

1. Field of the Invention

The present invention relates to an image processing method, and more particularly to an image processing method in which defects in the color tone of the pupils of a photographed object in a digital image are detected and corrected.

2. Description of the Related Art

Hitherto, there have may many cases in which objects have been photographed such that the color of the photographed object in an image is different from the color of the actual object due to the state of reflection of light during the photographing operation. The foregoing phenomenon, called "red-eye", looks very unnatural and deteriorates the appearance of the image. Therefore, an image processing is performed to correct the images so that it looks more natural.

If a person is photographed from the front by using an electronic flash, the so-called "red-eye" phenomenon occurs which causes the pupils to be photographed red or gold. The red-eye phenomenon occurs when light of the electronic flash is made incident from the front on the opened eyes of a person in a dark place. In the foregoing state, light is regularly reflected by the eyes. The foregoing state appears in the photographed image. The red-eye phenomenon includes "red-eye" in which the pupils are photographed red and "gold-eye" in which the pupils are photographed gold. (Hereinafter, these two phenomena are collectively called "red-eye".)

Since red-eye deteriorates the quality of the photograph, a variety of image processing methods for correcting red-eye have been disclosed. For example, a method has been disclosed in Japanese Patent Application Laid-Open (JP-A) No. 7-72537 in which regions including the eyes, which are regions at which red-eye is to be corrected, are designated. Then, threshold value processing of the saturation, luminance and the hue in the designated regions is performed. If pixels are in the regions predetermined threshold values, a determination is made that there is red-eye, and the red-eye is corrected. Another red-eye correction method has been disclosed in Japanese Patent Application Laid-Open (JP-A) No. 9-261580 in which pupil candidate regions are selected in accordance with color information and saturation information about the inside portions of regions surrounded by edges. Then, all of the pupils having defective color tone among the selected pupil candidate regions are corrected so that red-eye is corrected.

The conventional methods disclosed in Japanese Patent Application Laid-Open (JP-A) No. 7-72537 and Japanese Patent Application Laid-Open (JP-A) No. 9-261580 are arranged to perform threshold value processing of the saturation, luminance and the hue so as to determine the red-eye regions which must be corrected. Since the saturation, luminance and the hue of red-eye vary widely, errors in extraction and omissions from extraction cannot be prevented. There is also the concern that a strange image may be formed because flesh color portions may also be blackened in as a result of the process for correcting the red-eye of the pupils.

When extraction of edges of an image is performed as in Japanese Patent Application Laid-Open (JP-A) No. 9-261580, there is the concern that excess divisions or errors in dividing the regions may occur because an image has considerably complicated edges generally.

That is, sectioning into regions is not performed in Japanese Patent Application Laid-Open (JP-A) No. 7-72537 former method. Whether or not red-eye has occurred is determined in accordance with only the threshold values of colors. Therefore, it is easy for a region which does not require correction to be erroneously detected as a region which must be corrected together with a region which must be corrected. Further, Japanese Patent Application Laid-Open (JP-A) No. 9-261580 cannot accurately section the regions. Therefore, there arises the problem that it is difficult to correct only the pupil region which is the area which is the object of correction.

Hitherto, printing onto a photosensitive material of an image photographed on a photographic film (hereinafter called a "film"), such as a negative film or a reversal film, has been performed by direct exposure in which images on the film are projected to planarly expose of the surface of the photosensitive material. On the other hand, a digital photographic system has been put into practical use in which image information photographed on, for example, a film is photoelectrically read are converted into digital data which is then subjected to a variety of image processings. Thereafter, the photosensitive material is exposed in a digital manner.

The foregoing digital photographic system basically includes an image reading section, such as a scanner, for reading an image recorded on an original, such as a translucent original or a reflected original, to produce corresponding image data; an image processing section for subjecting image data inputted thereto to a variety of image processings and an image recording section having a printer for digitally exposing the photosensitive material in accordance with the to processed image data and a processor for developing the exposed photosensitive material and the like.

In the digital photographic system, the image of an original is read by the scanner. The read image is converted into digital image data. In the image processing section, image processing conditions (exposing conditions) are determined in accordance with the image data, and then a variety of image processings are performed. In the printer, the photosensitive material is scanned and exposed in accordance with processed image data so that a latent image is recorded. Then, a development process suitable for the photosensitive material is performed by the processor. As a result, a finished print is produced in which the image photographed on the film is reproduced.

The digital photographic system is able to shorten the time required to complete the exposure, that is, can quickly complete the exposure. Moreover, image information of the finished print can be stored on a recording medium, such as a magneto-optical disk. Therefore, re-reading of the film is not required and the operation for printing extra copies can quickly and easily be performed. Moreover, image processings such as editing operations (e.g., image synthesis and image division) and color/density adjustment can arbitrarily be performed. Therefore, an advantage can be realized in that a finished print which has been freely subjected to editing and image processings as needed can be output.

One of the important factors influencing the quality of the image of a portrait photograph is the reproducibility of the eyes of a human being. In particular, the red-eye phenomenon in which the eyes are photographed red due to the effects of the electronic flash or the like is a serious problem. Even in a case of a photograph of a satisfactory quality and free from the red-eye phenomenon, light must be reflected and shone in each eye. That is, if the catch light in the eye is expressed in the photograph too weakly, there arises a problem in that a portrait photograph having a satisfactory image quality cannot be obtained.

To solve the above-mentioned problems, the applicant of the present application proposed an image processing method and apparatus in Japanese Patent Application Laid-Open (JP-A) No. 10-75374. That is, the eye region is extracted from a region designated by an operator and including the eyes, and then determination of red-eye of the eye region is performed. If it is determined that there is red-eye, a red-eye eliminating process is performed. A catch light determination is performed after the eye region has been extracted. If a determination is made that the catch light is too weak, a process for enhancing the catch light is performed.

The above-described image processing method and apparatus disclosed in Japanese Patent Application Laid-Open (JP-A) No. 10-75374 enable correction of dark eyes to be performed by lowering the saturation of the eye region to make the color close to an achromatic color in a case of dark eyes. However, in a case of blue eyes, for example, the desired hue of blue is instructed in advance and stored, and conversion of the hue is carried out so as to perform correction for blue eyes. However, there arises a problem in that the difference in the hue from that of the eye of the photographed person can be recognized in the case of a close-up photograph of the eyes. In this case, an unsettling image is formed.

SUMMARY OF THE INVENTION

Accordingly, a first object of the present invention is to provide an image processing method which is able to accurately divide regions of any image to select a region which must be corrected as an object-of-concern region (a region to be corrected). A second object of the present invention is to provide an image processing method which is capable of accurately selecting a pupil region. A third object of the present invention is to provide an image processing method which is capable of accurately correcting a pupil region which is an object-of-correction region. A fourth object of the present invention is to provide an image processing method which is capable of producing a finished print with a natural feel from a corrected image. A fifth object of the present invention is to provide an image processing method which is capable of overcoming the problems experienced with conventional techniques and naturally correcting a portion to be corrected of an image, for example, red-eye, without resulting in a print with an unnatural feeling.

To achieve the first object, an image processing method of the present invention comprises the steps of: making an image region, which includes an eye region having discoloration and which has been designated in advance, to be an xy plane, and obtaining an image characteristic amount for each pixel by using any one of hue, saturation and lightness or a combination of two or more of the hue, the saturation and the lightness; setting a three-dimensional xyz space on whose z axis are plotted the image characteristic amounts, and sectioning the xy plane of each region whose z axis values are distributed in a crest-shape with respect to the spread of the xy plane; and determining a discoloration region of a pupil in accordance with any one of or a combination of two or more of information about the shape, information about the position, information about the surface area and a statistical image characteristic amount on the xy plane of each of the sectional regions, and correcting the region determined to be a discoloration region to an image of a normal eye.

That is, the method according to the present invention is a method of collectively extracting and correcting discoloration regions, such as red-eye regions including a catch light portion. The closer to the central portion of the pupil, the greater the reflection of light off of the retina. Thus, in red-eye portions the lightness tends to decrease from the central portion to the periphery. Therefore, a crest-shape distribution of the lightness including the catch light is used. Moreover, the fact that the iris portion of a brown-type pupil is the valley of the lightness distribution is used. On the other hand, the degree of red of a blue-eye-type pupil is the valley from the pupil portion of the red-eye.

That is, the characteristic amount obtained by combining the lightness and the degree of red is used. The method of the present invention also utilizes the fact that a valley of the characteristic amount is formed between the red-eye portion, the white portion adjacent the red-eye portion, and the skin portion. Each crest portion of the characteristic amount is sectioned into regions so that the red-eye portion is separated from the whites-of-the-eyes portions and the skin portion.

In a second aspect of the present invention, sectioning of the xy plane of the image region distributed in each crest-shape is performed by: carrying out a number assigning process for each of the pixels within the image region designated in advance such that pixels within the image region designated in advance are grouped into reference regions each having pixels of N rows×M columns (where each of N and M is not smaller than one) created around a pixel of interest which is the pixel in the reference region to which a number is to be assigned, and if the characteristic amount of all of the pixels in the reference region, the pixels of interest is considered to be the peak of a crest and a new number is assigned thereto, whereas if the characteristic amount of the pixels of interest is not the greatest characteristic amount of all of the pixels in the reference region and the pixel other than the pixel of interest in the reference region having the greatest characteristic amount has an assigned number, the assigned number is assigned to the pixel of interest as well, and this number assigning process is repeated until all of the pixels in the image region designated in advance are each assigned a crest peak number, and setting pixels having the same assigned number as respective regions, and sectioning the image region designated in advance into these respective regions. Since this method enables the division into regions to be performed by a computer program by a computer program, there is no need for the user to perform the complicated dividing operation.

In a third aspect of the present invention, sectioning of the xy plane of each region having a crest-shape distribution is performed by repeating a process in which, among pixels in the image region designated in advance, a pixel which has not been assigned a number is employed as a pixel of interest, and when a pixel having a characteristic amount which is larger than that of the pixel of interest is detected in a reference region of pixels of N rows×M columns (where each of N and M is not smaller than one) centered around the pixel of interest, the position of the pixel of interest is stored, and the pixel having the large characteristic amount is employed as a new point of interest, a number assigning process is carried out in which, when the new point of interest has the largest characteristic amount in the reference region and the new point of interest has not been assigned a number, the new point of interest is employed as the peak of a crest and a new number is assigned to the point of interest, and when a number has already been assigned to the new point of interest, the number is assigned to all pixels having stored coordinates, and this number assigning process is repeated until all pixels in the image region designated in advance are each assigned a crest number, and the image region is sectioned by a set of pixels having the same number being made to be one region.

The coordinates of the position of a pixel to which a number cannot be given are stored. Then, the number of the pixel which is the final new point of interest is given to all of the pixels having the stored coordinates. Thus, the process for sectioning into regions each of the crests of the characteristic amount can quickly be completed.

In a fourth aspect of the present invention, the determination of a discoloration region of the pupil is performed by determining for each sectioned region at least any one of the following five marks: a first mark which serves as information about the shape of the sectioned region by using a characteristic amount of the degree of roundness, and the greater the degree of roundness, the higher the first mark, a second mark which serves as information about the position of the sectioned region, and the closer the center of gravity of the sectioned region is to the center of the designated region, the higher the second mark, a third mark which serves as information about the surface area of the sectioned region, and the more the ratio of the surface area of the sectioned region and the surface area of the designated region deviates from a predetermined range, the lower the third mark, a fourth mark which serves as a statistical image characteristic amount expressing a degree of poorness of the color tone of the sectioned region, the fourth mark being obtained by comparing at least one of an average value, a maximum value, a minimum value, contrast and histogram shape of at least one of the hue, saturation and lightness of the second region with statistical information on regions having discoloration, a fifth mark which serves as information about the position of the sectioned region and which is obtained in accordance with the previously designated position of the center of the pupil and the distance between the two eyes, and the further the position of the sectioned region from the center of the pupil, the lower the fifth mark, and the sectioned region having the highest mark is determined to be a discoloration region.

That is, according to the fourth aspect of the present invention, in the method of the first aspect in which a discoloration region such as a red-eye region is determined from sectioned regions, the statistical characteristic amounts of the shape, area, position and the density of each sectioned region are converted into the first to fifth marks which tend to increase the closer the sectioned region is to the pupil and decrease the further the sectioned region is from the pupil. At least one of the first to fifth marks is used to judge whether the sectioned region is a discoloration region.

The relationship between the distance between two eyes and the diameter of the pupil is such that if the distance between the eyes is multiplied by a predetermined coefficient (gradually 0.07 to 0.11), the resulting product is the diameter of the pupil. On the basis of this relationship, the diameter of the pupil is calculated from the center of the pupil designated in advance and the distance between the eyes. A circular region having this diameter is given the highest fifth mark. The fifth mark decreases the further the sectioned region is from this center.

It is preferable that the L (L is an integer not smaller than one) regions having the highest averages or weighted averages of two or more marks are determined to be discoloration regions, as in the fifth aspect of the present invention. Since the weighted average is calculated, the respective regions are differentiated from one another even more. Therefore, a discoloration region can accurately be determined.

To achieve the third and fourth objects, a sixth aspect of the present invention comprises the steps of: making an image region, which includes an eye region having discoloration and which has been designated in advance, to be an xy plane, and obtaining an image characteristic amount for each pixel by using anyone of hue, saturation and lightness or a combination of two or more of the hue, the saturation and the lightness; setting a three-dimensional xyz space on whose z axis are plotted the image characteristic amounts, and sectioning the xy plane of each region whose z axis values are distributed in a crest-shape with respect to the spread of the xy plane; and determining a discoloration region of a pupil in accordance with any one of or a combination of two or more of information about the shape, information about the position, information about the surface area and a statistical image characteristic amount on the xy plane of each of the sectional regions, and performing correction including a process for having gradation such that the lightness and/or saturation is gradually lowered from the periphery of the determined discoloration region of the pupil to the central portion so as to correct the determined discoloration region of the pupil to an image of a normal eye.

That is, the sixth aspect of the present invention determines the discoloration region by a method similar to that according to the first aspect. Therefore, a discoloration region, such as a red-eye portion, can accurately be separated from the whites-of-the-eyes portions and the skin portion. Thus, correction can accurately be performed.

To achieve the fourth object, the sixth aspect of the present invention is structured to have gradation such that the lightness and/or saturation is gradually lowered from the periphery to the central portion. As a result, an atomosphere can be realized which is similar to the color of the actual pupil portion in which the color in the central portion is darker than the peripheral portion. Therefore, a corrected image of the pupil which has a natural look can be obtained. Since the seventh to the ninth aspects of the present invention have similar operations as those of the fifth aspect, description thereof is omitted.

A tenth aspect of the present invention comprises the steps of: making an image region, which includes an eye region having discoloration and which has been designated in advance, to be an xy plane, and obtaining an image characteristic amount for each pixel by using any one of hue, saturation and lightness or a combination of two or more of the hue, the saturation and the lightness; setting a three-dimensional xyz space on whose z axis are plotted the image characteristic amounts, and sectioning the xy plane of each region whose z axis values are distributed in a rest-shape with respect to the spread of the xy plane; and determining a discoloration region of a pupil in accordance with any one of or a combination of two or more of information about the shape, information about the position, information about the surface area and a statistical image characteristic amount on the xy plane of each of the sectional regions, and adjusting the position having the highest lightness in the determined discoloration region to be a catch light position, and performing correction including a process for forming a catch light pattern at the catch light position, so as to correct the determined discoloration region of the pupil to an image of a normal eye.

Similarly to the sixth aspect, the tenth aspect of the present invention determines a discoloration region by a method similar to that according to the first aspect. Therefore, a discoloration region, such as a red-eye portion, can accurately be separated from the whites-of-the-eyes portions and the skin portions. Thus, correction can accurately be performed.

According to the tenth aspect of the present invention, the position in the pupil portion having the highest lightness is determined to be the catch light position, and a catch light pattern is formed. Since the catch light portion is a region having a low density in the pupil portion which has a high density, the position of the catch light is the brightest position. When a process for forming the catch light at the position in the pupil region having the highest lightness is performed, a natural and lively image of the eye can be obtained.

Since the eleventh to fifteenth aspects of the present invention have similar operations as those of the second to fifth aspects, description thereof is omitted.

A sixteenth aspect of the present invention comprises the steps of: making an image region, which includes an eye region having discoloration and which has been designated in advance, to be an xy plane, and obtaining an image characteristic amount for each pixel by using any one of hue, saturation and lightness or a combination of two or more of the hue, the saturation and the lightness; setting a three-dimensional xyz space on whose z axis are plotted the image characteristic amounts, and sectioning the xy plane of each region whose z axis values are distributed in a crest-shape with respect to the spread of the xy plane; and determining a discoloration region of a pupil in accordance with any one of or a combination of two or more of information about the shape, information about the position, information about the surface area and a statistical image characteristic amount on the xy plane of each of the sectional regions and enlarging/reducing normal color tone pupils cut out from a normal pupil region to have a size which coincides with the size of the determined discoloration region, and performing correction including a process for pasting the normal color tone pupils to the pupil region determined to be a discoloration region, as to correct the discoloration region of the pupil to an image of a normal eye.

That is, in the sixteenth aspect of the present invention, a pupil having a normal color and cut from a normal pupil region is enlarged or reduced and pasted onto the pupil region determined to be a discoloration region. Therefore, a relatively simple correction process is able to correct a discoloration region of the pupil to a normal image of an eye. Since the seventeenth to twentieth aspects of the present invention have similar operations as those of the second to fifth aspects, description thereof is omitted.

To achieve the fourth object, in a twenty-first aspect, in the image processing method of any one of first to twentieth aspects of the present invention, further correction is performed such that the atmosphere of the image of the eye including a corrected pupil portion and the state of the image of portion of eye for which correction is unnecessary are the same, or such that when discoloration of both eyes has been corrected, the states of the both eyes are the same.

The position of an eye which does not require correction and the position of a corrected eye are compared with each other. Then, fine correction can be performed such that the position of the corrected image of the eye is shifted to a natural position or the color of the corrected eye is made to be the same as the color of the eye which does not require correction. Therefore, an image having a natural look can be formed. Moreover, the position of the catch light is corrected to make the positions of catch light in the pupils to be the same.

In a twenty-second aspect of the present invention, the red-eye correction is carried out plural times. Namely, in the twenty-second aspect, in the image processing method of any one of first to twenty-first aspects of the present invention, in accordance with number of times of a designated region including an eye region having discoloration, the characteristic amount for use in a method of sectioning an image or sectioning of a region is changed, or the type of the characteristic amount for use in determining a discoloration region, or a method of calculating the characteristic amount, or a criterion for judgment is changed, or a method of correcting a discoloration region is changed. For example, when the determination of the red-eye region is performed by dividing into regions each crest of the characteristic amount, the second determination of the red-eye region is performed on the basis of the similarity of the color tones, in stead of dividing each crest of the characteristic amount into regions. Alternatively, the degree of roundness, which is used in the first determination, is not employed or the surface, which is used to perform the first determination, is not employed.

To achieve the foregoing objects, according to a twenty-third aspect of the present invention, there is provided an image processing method applied to a digital photographic system for making a photographic print by subjecting digital image data to image processing, said image processing method comprising the steps of: selecting an image which is to be corrected, and an image including a characteristic portion corresponding to a portion to be corrected of the image to be corrected; designating a region including the portion to be corrected of the image to be corrected, and a region including the characteristic portion of the selected image; and using the characteristic portion of the selected image to correct the portion to be corrected of the image to be corrected.

When the image to be corrected is corrected, it is preferable that the image to be corrected, the selected image and a corrected image are and displayed together on an image display portion of the digital photographic system.

It is preferable that correction of the image to be corrected includes correction of at least one of red-eye, wrinkles, blotches, freckles, pimples, scars, and burn marks.

BRIEF DESCRIPTION OF THE DRAWINGS

FIG. 1 is a schematic view showing the structure of a digital laboratory system according to an embodiment of the present invention.

FIG. 2 is a view showing the exterior of the digital laboratory system.

FIG. 3 is a control block diagram of an image processing section.

FIG. 8 is a diagram showing the relationship between the positions of pixels in catch light and the adjustment factor of the lightness.

FIG. 9 is a graph showing the lightness distributed along a lengthwise line passing through the corners of a eye in an image in which the red-eye correction process has been performed and a catch light pattern has been formed.

FIG. 11 is a schematic view showing an embodiment of a digital photographic system to which the present invention is applied.

FIG. 12 is a block diagram showing an embodiment of an image processing section.

FIG. 13 is a schematic view showing an embodiment of red-eye eliminating processing of the image processing method according to the present invention.

FIG. 14 is a schematic view showing an embodiment in which a image processed by the image processing method according to the present invention is displayed.

FIG. 19A is a diagram showing a region which to be processed.

FIG. 19B is a graph showing marks of regions along the line of sight shown in FIG. 19A.

FIG. 20A is a diagram showing first and second marks assigned to six sectioned regions.

FIG. 20B is a diagram showing an average mark of each of the six sectioned regions.

DESCRIPTION OF THE PREFERRED EMBODIMENTS

Figure 4:
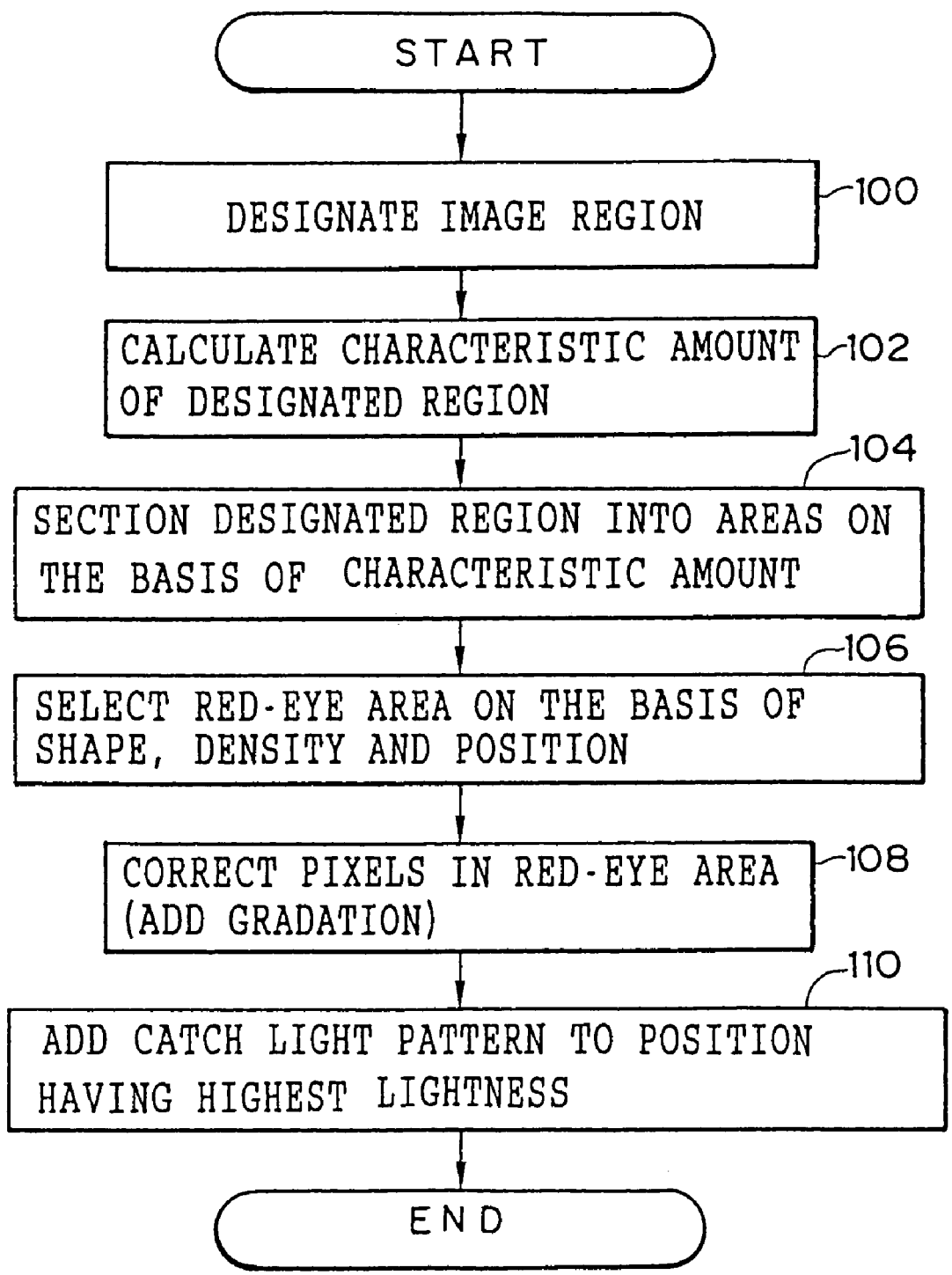
FIG. 4 is a flow chart showing a red-eye correction processing which is performed by red-eye processing sections 220 and 222.

FIGS. 1 and 2 show the schematic structure of a digital laboratory system 10 according to an embodiment of the present invention.

As shown in FIG. 1, the digital laboratory system 10 incorporates a line CCD scanner 14, an image processing section 16, a laser printer section 18 and a processor section 20. The line CCD scanner 14 and the image processing section 16 are unified into an input section 26 structured as shown in FIG. 2. The laser printer section 18 and the processor section 20 are unified into an output section 28 structured as shown in FIG. 2.

The line CCD scanner 14 reads frame images recorded on a photographic film, such as a negative film or a reversal film. The line CCD scanner 14 is able to read, for example, a 135-size photographic film, a 110-size photographic film, a photographic film (a 240-size photographic film which is a so-called "APS film") having a transparent magnetic layer; a 120-size photographic film and a 220-size (a Brownie film) photographic film. The line CCD scanner 14 incorporates a line CCD 30 which reads the frame images, which is to be read. Then, an A/D converting section 32 of the line CCD scanner 14 A/D-converts the read images to output obtained image data to an image processing section 16.

In this embodiment, the digital laboratory system 10 processes the 240-size photographic film (he APS film) 68.

The image processing section 16 can be input with image data (scanned image data) output from the line CCD scanner 14. Moreover, the image processing section 16 is able to be input extremely image data photographed by a digital camera 34 or the like, image data obtained by an original (for example, a reflected original) read by a (flat bed type) scanner 36, image data generated by another computer and recorded in a floppy disk drive 38 or MO drive or a CD drive 40 and communicated image data received through a modem 42 (hereinafter foregoing image data is collectively called "file image data").

The image processing section 16 stores input image data in an image memory 44 to subject image data to various image processings including correction and arranged to be performed by a color tone processing section 46, a hypertone processing section 48 and a hyper-sharpness processing section 50. Then, the image processing section 16 outputs image data, as image data which must be recorded, to the laser printer section 18. The image processing section 16 is able to output processed image data as an image file to the outside (for example, the image processing section 16 is able to output image data to a storage medium, such as an FD, an MO, a CD or the like and communicate the same to another information processing apparatus through a communication line).

The laser printer section 18 incorporates R, G and B laser-beam sources 52 and controls a laser driver 54. Thus, the laser printer section 18 irradiates photographic paper 62 with a laser beam modulated in accordance with image data (which is temporarily stored in an image memory 56) which has been input from the image processing section 16 and which is to be recorded. Thus, the laser printer section 18 performs scan exposure (by an optical system comprising a polygonal mirror 58 and a f$^\theta$ lens 60 in this embodiment) to record an image on the photographic paper 62. The processor section 20 subjects the photographic paper 62 having the image recorded by the scan exposure performed by the laser printer section 18 to color development, bleaching and fixing, water washing and drying. As a result, the image is formed on the photographic paper 62.

(Structure of Line CCD Scanner)

The structure of the line CCD scanner 14 will now be described. FIG. 1 shows the schematic structure of the optical system of the line CCD scanner 14. The optical system incorporates a light source 66 for irradiating the photographic film 68 with light. A light diffusing plate 72 for converting light with which the photographic film 68 is irradiated into diffused light is disposed at a position adjacent to the light emission portion of the light source 66.

The photographic film 68 is moved by a film carrier 74 disposed adjacent to the light diffusing plate 72 such that the surfaces of the frame images are positioned perpendicular to the optical axis.

A lens unit 76 for focusing light allowed to pass through the frame image and the line CCD 30 are disposed opposite to the light source 66 through the photographic film 68, the foregoing elements being sequentially disposed in the direction of the optical axis. Although the illustrated lens unit 76 comprises a single lens, the lens unit 76 is a zoom lens composed of a plurality of lenses. Note that the lens unit 76 may be a SELFOC lens. In the foregoing case, it is preferable that the two ends surfaces of the SELFOC lens are positioned as much as close to the photographic film 68 and the line CCD 30.

The line CCD 30 incorporates sensing portions each having a plurality of CCD cells disposed in a line in the direction of the width of the photographic film 68 which is moved. Each sensing portion has an electronic shutter mechanism. Three parallel lines of the sensing portions are disposed apart from one another. Any one of R, G and B color decomposing filters is joined to the light incident portion of each sensing portion (that is, a so-called three-line color CCD is constituted) The line CCD 30 is disposed such that the light receiving surface of each of its sensing portion is disposed at the focusing position of the lens unit 76.

A shutter (not shown) is disposed between the line CCD 30 and the lens unit 76.

(Structure of Control System of Image Processing Section 16)

FIG. 3 is a control block diagram for performing processes including the operation of the image memory 44, the color tone process 46, the hyper-tone process 48 and the hyper-sharpness process 50 which are main processes of the image processing section 16 shown in FIG. 1.

R, G and B digital signals output from the line CCD scanner 14 are, in a data processing section 200, subjected to predetermined data processes including darkness correction, correction of a defective pixel and shading correction. Then, digital signal is converted into digital image data (density data) by a log converter 202. Prescan data is stored in a prescan memory 204, while fine scan data is stored in a fine scan memory 206.

Prescan data stored in the prescan memory 204 is transmitted to a prescan processing section 212 composed of an image data processing section 208 and an image data converting section 210. On the other hand, fine scan data stored in the fine scan memory 206 is transmitted to a fine scan processing section 218 composed of the image data processing section 214 and the image data converting section 216.

The prescan processing section 212 and the fine scan processing section 218 perform corrections in accordance with the characteristic of the lens with which the image has been photographed and the light distribution characteristic of the electronic flash for use in a photographing operation.

The following sections are connected to the image data processing sections 208 and 214: a film characteristic storage section 232 for storing the characteristics of various films; and a lens characteristic data supply section 234 for obtaining information for determining the camera with which the film has been photographed to output the characteristic of the lens corresponding to the foregoing camera.

The characteristic of the film is a gradation characteristic ($\gamma$ characteristic) which is usually expressed with a curve indicating the density which is three-dimensionally changed in accordance with the light exposure. Since the foregoing fact is a known technique, it is omitted from description.

As for the identification of the type of film in this embodiment, information indicating the type of film has been recorded in a magnetic recording layer of the APS film. Thus, a magnetic head is able to read information when the APS film is moved by the film carrier 74 of the line CCD scanner 14. When the 135-size film is identified, its shape (perforations are provided at two ends in the widthwise direction in relatively short pitch) may be used to perform the identification. As an alternative to this, the type of film may be input by an operator. If the type of film can be identified, the relative density of the image with respect to the base density of the film can be calculated.

The image data processing sections 208 and 214 correct the reference value to correspond to the type of film and that of camera obtained from the film characteristic storage section 232 and the lens characteristic data supply section 234. Then, a variety of processes are performed which include a color balance adjustment, adjustment of contrast (a color tone process), brightness correction and saturation correction (the hypertone process) and a hypersharpness process. The processes are performed by using a LUT or performing a matrix (MTX) operation.

The image data processing sections 208 and 214 are provided with red-eye processing sections 220 and 222 for correcting the red-eye pupil portions into natural colors after the various adjustments and corrections have been completed. The red-eye correcting processes which are performed by the red-eye processing sections 220 and 222 will be described later.

The image data converting section 210 for prescan data converts image data processed by the image data processing section 208 into display image data which is to be displayed on a monitor 16M in accordance with a 3D-LUT. On the other hand, image data converting section 216 for fine scan data converts image data processed by the image data processing section 214 into print image data which is to be printed by the laser printer section 18 in accordance with the 3D-LUT. Image data which must be displayed and image data which must be printed, which are formed by different color systems, are attempted to be made coincide with each other by performing the following various corrections.

That is, a condition setting section 224 is connected to the prescan processing section 212 and the fine scan processing section 218. The condition setting section 224 incorporates a set-up section 226, a key correction section 228 and a parameter unifying section 230.

The set-up section 226 uses prescan data to determine reading conditions required to perform the fine scan and communicates the reading conditions to the line CCD scanner 14. Moreover, the set-up section 226 calculates image processing conditions for use in the prescan processing section 212 and the fine scan processing section 218. The set-up section 226 communicates the image processing conditions to the parameter unifying section 230.

In accordance with a variety of instructions input by operating keys and/or a mouse of a keyboard 16K for adjusting the color, contrast, sharpness, saturation and the like, the key correction section 228 calculates amounts of adjustment of the image processing conditions. The key correction section 228 communicates the amount of adjustment to the parameter unifying section 230.

The parameter unifying section 230 transmits, to the prescan side and fine scan side image data processing sections 208 and 214, the image processing conditions communicated from the set-up section 226 and the key correction section 228. Thus, the image processing conditions are corrected or reset.

The red-eye correcting processes which are performed by the red-eye processing sections 220 and 222 will now be described with reference to a flow chart shown in FIG. 4.

In step 100, images of pupils which are red eyes and the surrounding portions thereof are designated as image regions to be processed, from an image displayed on the monitor 16M. The displayed image has been subjected to the color balance adjustment, contrast adjustment, brightness correction, saturation correction (hypertone processing) and the hypersharpness processing, and has been corrected by various processings by using the LUT and by performing the matrix (MTX) calculations.

The designation of the region to be processed can be made by an operator by inputting data through the key correction section 228. As an alternative to this, regions of the image in which red color is concentrated may be extracted by the image data processing section 214. In the present embodiment, the operator performs key input to designate a region to be processed through the key correction section 228.

As the method by which the operator designates a region to be processed, a mode may be selected from six modes which include two-eyes collective designation mode 1, two-eyes collective designation mode 2, single designation mode 1, single designation mode 2, single designation mode 3 and single designation mode 4, as shown in FIGS. 15A to 15F.

Figure 15A:
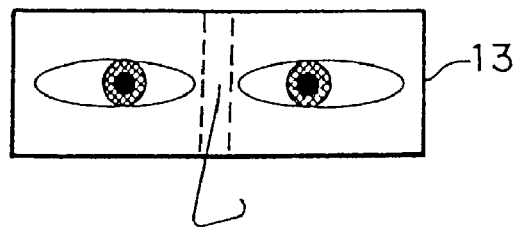
FIGS. 15A to 15F are diagrams showing examples of methods performed by an operator of designating a region to be processed.

The two-eyes collective designation mode 1 is a mode for surrounding a region including the two eyes and their surrounding regions with a rectangular frame 13 by operating the mouse and/or the keyboard provided at the image processing section 16 to designate the region in the frame 13, as shown in FIG. 15A. In this case, the designated region is divided at a predetermined ratio from the two outer side portions of the major axis of the frame 13 as indicated by the dashed lines shown in FIG. 15A so that obtained divisional regions are employed as the regions to be processed. The predetermined ratio is obtained by statistically calculating the ratio of the eye with respect to the length of the major axis of the frame 13. Each of the sectioned regions includes at least one eye, and the region between the eyebrows is excluded. Note that the frame 13 is not limited to a rectangular frame. Another shape, for example, an elliptical shape may be employed.

Figure 15B:
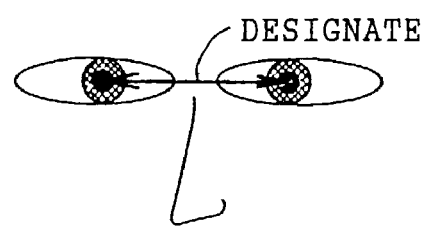

The two-eyes collective designation mode 2 is, as shown in FIG. 15B, a mode for designating the central portions of the two pupils with the mouse and/or the keyboard provided at the image processing section 16 so as to designate regions including the two eyes and their surrounding portions. In this case, each eye region is an elliptical region, whose length at a predetermined ratio from the both ends of a straight line connecting the central portions of the pupils of the designated eyes, is one half of the major axis. The obtained divisional regions are the regions to be processed.

In the same way as in the two-eyes collective designation mode 1, the predetermined ratio is a ratio which can be obtained by statistical calculation of the ratio of the size of the eye with respect to the straight line connecting the central portions of the pupils of the two designated eyes. Each elliptical region includes at least one eye, and the region between the eyebrows is omitted.

The two-eyes collective designation mode 1 and the two-eyes collective designation mode 2 may be structured such that the eye region is not divided into a sectioned region for each eye. In this case, a region including both eyes is employed as the region to be processed to collectively perform the red-eye extraction processing.

Figure 15C:
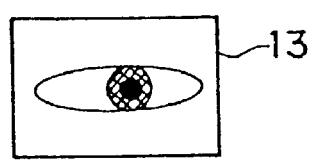

The single designation mode 1 is, as shown in FIG. 15C, a mode in which a region of one eye including its surrounding region is surrounded by the rectangular frame 13 by operating the mouse and/or the keyboard provided at the image processing section 16, and the region in the frame 13 is used as the region to be processed. Also in this case, the shape of the frame 13 is not limited to a rectangular shape. Another shape may be employed.

Figure 15D:
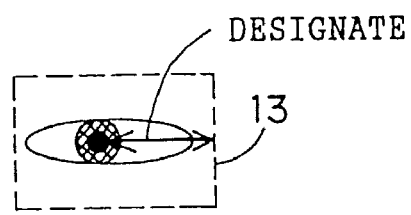

The single designation mode 2 is, as shown in FIG. 15D, a mode in which the central portion of the eye and the position of a frame including the entire eye portion are designated. In accordance with a ratio which can statistically be obtained from the position of the frame with respect to the central portion, the frame 13 including one eye is automatically formed so as to designate the region in the frame 13 as the region to be processed.

Figure 15E:
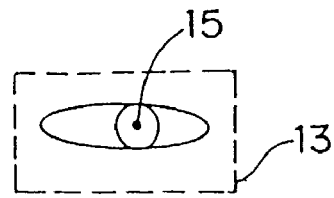

The single designation mode 3 is, as shown in FIG. 15E, a mode in which one portion 15, which is either the central portion of the eye or the surrounding portion of the eye, is designated to automatically form a frame 13 having a default size which includes the entire eye. The region in the frame 13 is designated as the region to be processed. In this case, the entire face may be designated by being surrounded with a rectangular or elliptical frame or the like. In accordance with the ratio of the face and the eye, a frame having a size corresponding to the region of one eye or the region of both eyes is automatically formed. The region in the frame is designated as the region to be processed. Another mode may be employed in which the central portions of the two eyes are designated and a frame including the two eyes is automatically formed. Then, the region in the frame is designated as the region to be processed.

Figure 15F:
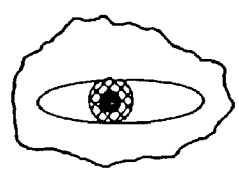

The single designation mode 4 is, as shown in FIG. 15F, a mode in which a region including the eye is manually encircled by using the mouse and/or the keyboard provided for the image processing section 16 to form a frame. Then, the region in the frame is designated as the region to be processed.

In step 102, a characteristic amount of the region to be processed which has been designated in any one of the six modes is calculated. The value of a color obtained from the hue, the saturation and lightness, which are extracted elements, is selected. Then, an amount of a characteristic, with which the images of the pupil portions can collectively be cut-out, is selected.

The intensity of the red component is indicated by value r. The greater the intensity of the red component, the higher the value of r. In the red-eye portion, the value r is large. The value r is a negative value in a case of blue eyes. The lightness is expressed by a gray value d. Light pixels have high d values. Thus, the gray value d is large at the catch light portions and at the whites of the eyes. The gray value d is small in the iris portions of brown pupils.

Assuming that the red value (r) is characteristic amount A and the gray value (d) is characteristic amount B, the value of characteristic amount C is obtained from the following equation (1):

$$C = \alpha \times B + (1-\alpha) \times |A| \quad (1)$$

where a preferred value of α, which is not less than 0.3 nor more than 0.5 and which has been obtained from experiments, may be replaced with another value. Then, the thus-obtained values of the characteristic amount C are graphed such that the axis of abscissa represents positions of a straight line which passes through the pupil. The waveform of the graph has crests and valleys which correspond to regions of elements (for example, the whites of the eyes, pupil portions and skin portions) which form the image. Note that the foregoing definition of the characteristic amount may be d=(R+G+B)/3 and A=(R−d) which is color expression using R, G and B.

Figure 5:
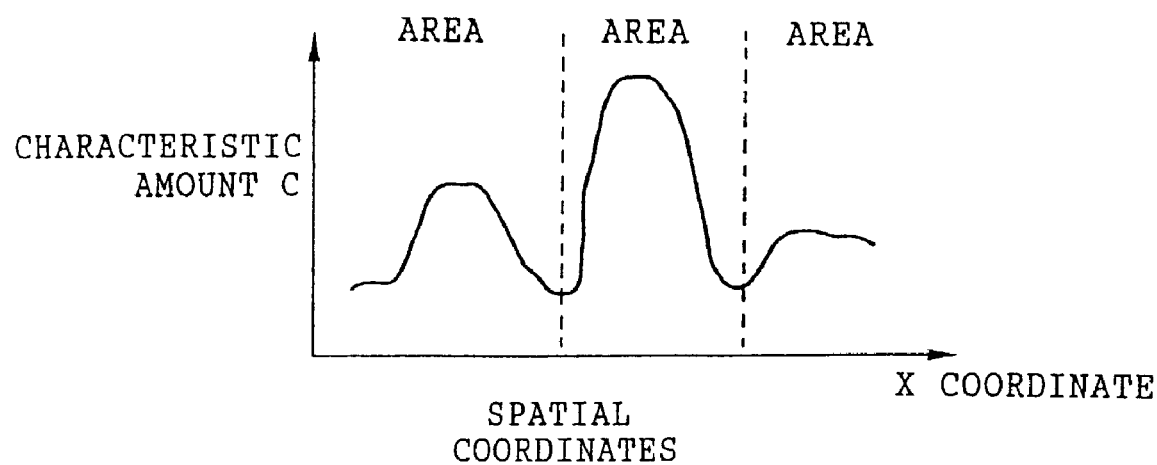
FIG. 5 is a graph showing a characteristic amount C calculated along a lengthwise line passing through the corners of an eye.
Figure 10A:
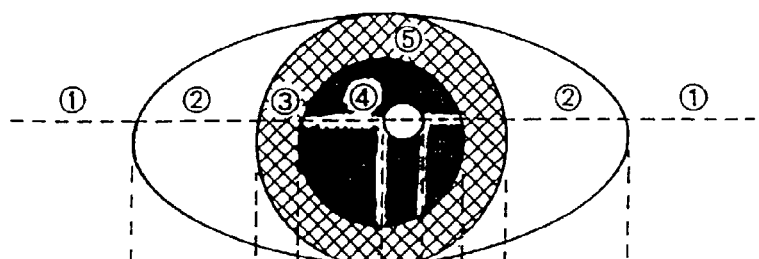
FIG. 10A is a schematic front view showing an eye.

The graph of the characteristic amount C is calculated along a lengthwise directional line passing through the corners of the eyes. As shown in FIG. 5, for example, the graph is formed in a waveform having three crests which correspond to the two white portions on the right and left sides of the pupil and to the region of the pupil (see FIG. 10A). Note that the foregoing equation for calculating the characteristic amount C includes the characteristic amount A which is made to be the absolute value. Thus, the performance for extracting red-eye from blue-eye-type pupils, from which red-eye cannot easily be extracted as compared with brown-type eyes, can be improved.

Figure 10B:
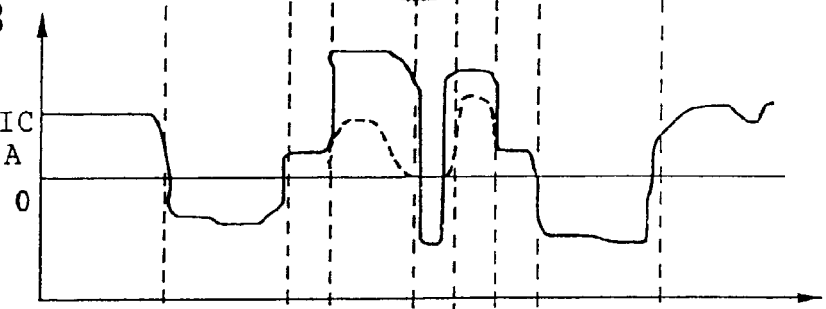
FIG. 10B is a graph showing characteristic amount A calculated along a lengthwise line passing through the corners of the eye.
Figure 10C:
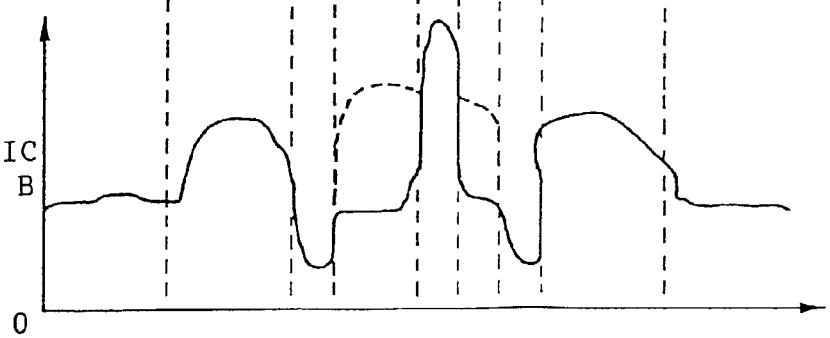
FIG. 10C is a graph showing characteristic amount B calculated along the lengthwise line passing through the corners of the eye.

As another example, a graph of the characteristic amount A is shown in FIG. 10B and a graph of the characteristic amount B is shown in FIG. 10C. Referring to FIGS. 10B and 10C, the solid line indicates the characteristic amount of red-eye which is the phenomenon that pupils are photographed red, the dashed line indicates the characteristic amount of gold-eye which is the phenomenon that pupils are photographed gold, and the overlap region is indicated by the solid line. As can be understood from these graphs, in the gold-eye phenomenon, the reflected light is strong. Therefore, a yellowish color is formed which has a high lightness.

In step 104, as shown in FIGS. 10B and 10C, dividing (sectioning) of the image is performed in each region in which the characteristic amount forms a crest.

As the method of dividing the region, the user designates the pixel having the smallest characteristic amount (that is, a pixel positioned in the valley) to be sectioned as the region. Or a process using a program is performed. In the cases shown in FIGS. 10B and 10C, the red-eye region including catch light forms a crest, while the iris portion forms a valley in a region between the red-eye region and regions of the white of the eyes and the skin portion. The valleys serve as boundaries of the sectioned regions. When blue-eye-type pupils are in the red-eye state, the boundaries between the blue iris portion and the pupil portion serve as the boundary of sectioning of the area by |A|.

Figure 16A:
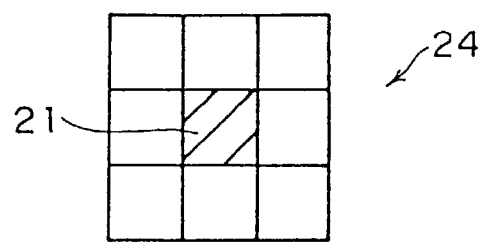
FIG. 16A shows a reference area for use in a number assigning process.
Figure 16B:
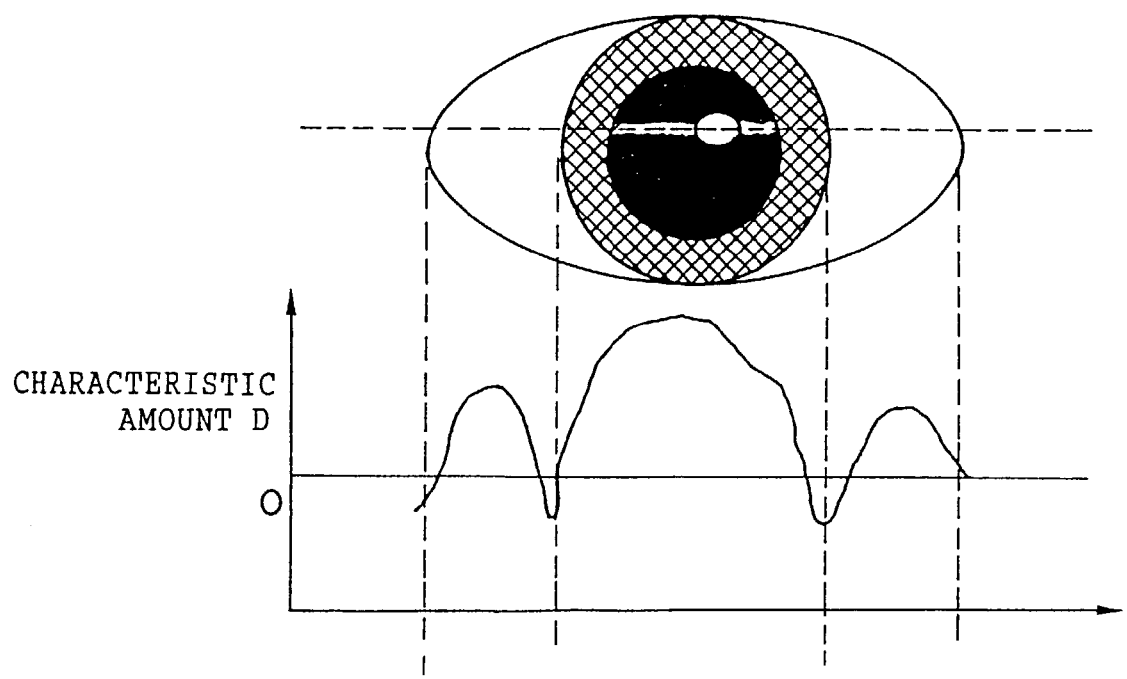
FIG. 16B is a graph showing selected characteristic amount D.

Another method as shown in FIG. 16B maybe employed. That is, characteristic amount D is selected which has crest shapes corresponding to the three regions which are the white portions on the two sides and the pupil portion in the center. Then, a number assigning process is performed to divide the regions.

The number assigning process is, as shown in FIG. 16A, a process in which a reference area 24, which is composed of 9 pixels arranged in three rows and three columns and whose central pixel which is a pixels of interest 21, is made to be a region which is subjected to the number assigning process. The number of the pixel having the largest characteristic amount in the reference area composed of the nine pixels is assigned to the pixels of interest 21.

An example will now be described in which a portion of characteristic amount D shown in FIG. 16B is enlarged for the sake of explanation. FIGS. 17B and 17C show columns of three rows which are the N th row of pixels, the N−1 th row of pixels above the N th row and the N+1 th row of pixels below the N th row which corresponds to the first and second crest portions of the characteristic amount D. Note that the coordinates of each pixel of interest are expressed as $(X_N, Y_m)$ (where m is a natural number not smaller than one).

When the first to third columns are made to be the reference area 24 as shown in FIG. 17B, it is determined whether or not the characteristic amount D of the pixel $(X_N, Y_2)$, which is the pixel of interest 21, is the largest in the reference area 24. In this case, the characteristic amount of a pixel $(X_N, Y_3)$ in the adjacent column is larger than that of the pixel $(X_N, Y_2)$ which is the pixel of interest 21, as shown in FIG. 13A. Therefore, no number is given to the pixel $(X_N, Y_2)$ which is the pixel of interest 21. Then, it is determined whether or not the characteristic amount of the pixel of interest in the next reference area is the largest in the reference area.

In this example, the process is performed such that the pixel of interest is moved by one pixel at a time along the N columns in the direction indicated by an arrow I. Therefore, the reference area is moved such that the next reference area is from, for example, the second column to the fourth column, and the next reference area is from, for example, the third column to the fifth column.

Figure 17A:
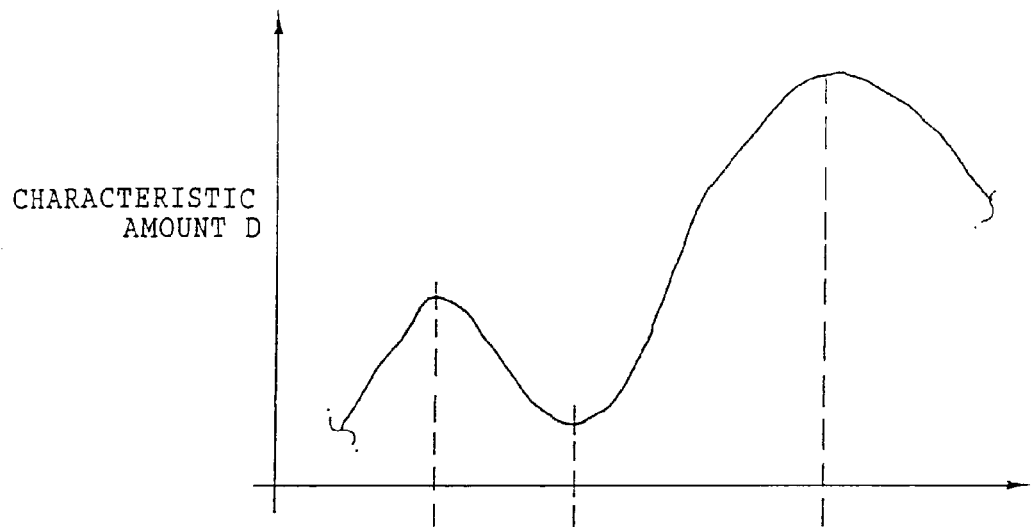
FIG. 17A is a graph showing a portion of characteristic amount D.
Figure 17B:
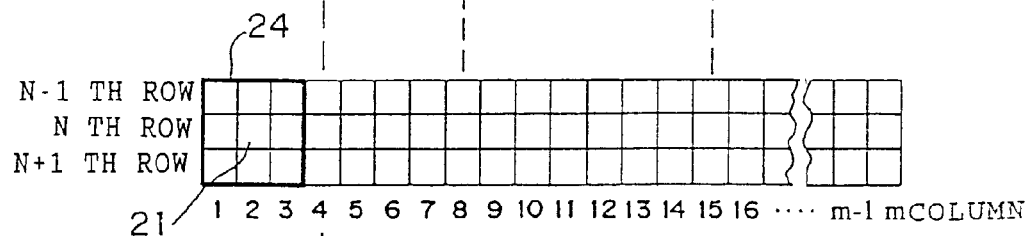
FIGS. 17B to 17D are diagrams showing a procedure for assigning numbers.
Figure 17C:
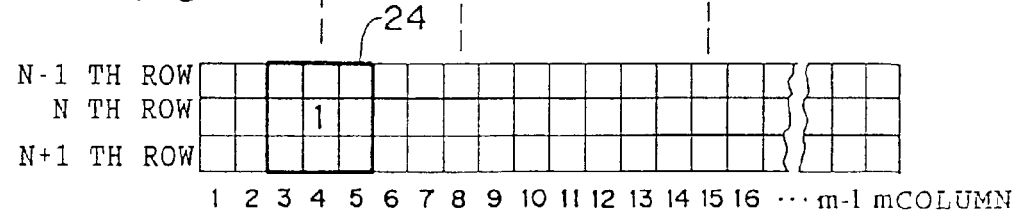

When the third to fifth columns are made to be the reference area as shown in FIG. 17C, the characteristic amount of the pixel $(X_n, Y_4)$ which is the pixel of interest 21 corresponds to the peak of a crest shown in FIG. 17A. Therefore, the characteristic amount is the largest. Thus, "1" is given as the new assigned number, and the magnitude of the characteristic amount of the pixel of interest in the next reference area (that is, the fourth to sixth columns) is determined.

The characteristic amount of each of the pixels of interest in the reference areas from the reference area of the fourth to sixth columns to the reference area of the eighth to tenth columns (in which the pixel corresponding to the valley is the pixel of interest) is smaller than that of the previous pixel of interest. Thus, "1" is given to all of the pixels of interest.

Figure 17D:
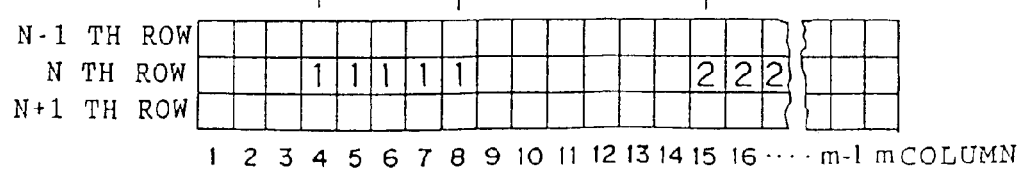

In the reference areas from the reference area of the seventh to ninth columns (in which the next pixel after the pixel corresponding to the valley is the pixel of interest) to the reference area of the thirteenth to fifteenth columns (in which a pixel which is one pixel before the pixel corresponding to the next crest is the pixel of interest), the characteristic quantity of each pixel of interest is larger than the characteristic amount of the previous pixel of interest without exception. Therefore, no number is given to any pixel. All pixels of interest from the reference area of fourteenth to sixteenth columns (in which the pixel corresponding to the next crest is the pixel of interest) to the reference area in which the pixel corresponding to the next crest is the pixel of interest are each given new assigned number "2". The foregoing operation is repeated. Thus, the assigning process for the first row is performed such that a new assigned number corresponding to each crest is given to portions, as shown in FIG. 17D.

Therefore, when the pixels of interest are in the N+1 th column, comparison of the characteristic amount in the reference area, including the comparison of the number which has been assigned as a result of the number assigning process for the N th column, is performed. Therefore, the number assigning process is repeated so that all of the pixels forming the crests are each given a number corresponding to the crest. Finally, all pixels are given numbers. Therefore, a plurality of regions sectioned with numbers corresponding to the crests of the characteristic amounts can be obtained.

When a pixel $(X_n, Y_{m+1})$ having a characteristic amount larger than that of the pixel of interest $(X_n, Y_m)$ exists in the reference area and no number is given to the pixel, the coordinates of the position of the pixel of interest $(X_n, Y_m)$ are stored. Moreover, a reference area is determined such that the pixel $(X_n, Y_{m+1})$ on the next column is the new pixel of interest. Then, it is determined whether or not the new pixel of interest $(X_n, Y_{m+1})$ has the largest characteristic amount in the newly determined reference area.

The following structure may also be employed. If a pixel having a characteristic amount larger than that of the new pixel of interest $(X_n, Y_{m+1})$ exists in the newly determined reference area, the coordinates of the position of the new pixel of interest $(X_n, Y_{m+1})$ are stored. The pixel $(X_{n+i}, Y_{m+i})$ (where each of i and j is an integer) having a characteristic amount larger than that of the new pixel of interest $(X_{n+1}, Y_{m+1})$ is employed as the new pixel of interest. Then, a similar process is repeated.

Figure 6:
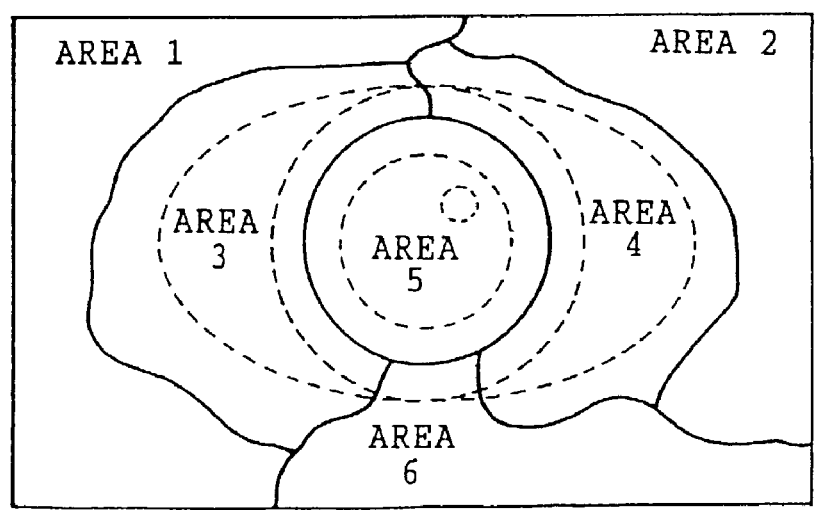
FIG. 6 is a diagram showing results of division of each crest in accordance with the characteristic amount C.
Figure 18:
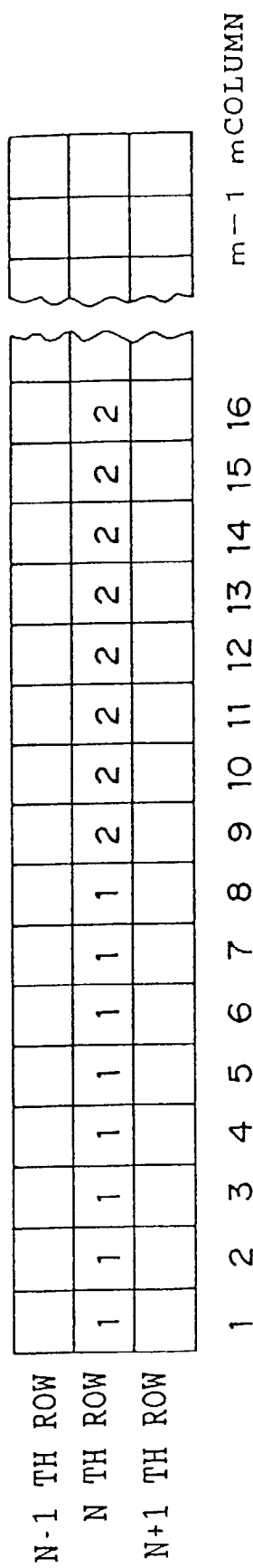
FIG. 18 is a diagram showing another method of assigning numbers.

In the foregoing case, it is not necessarily the case that only a pixel on the same column is made to be the pixel of interest. Cases in which no number can be given to a pixel subjected to the comparison of the characteristic amount one time are stored. When a number is given to the pixel having the largest characteristic amount in that region, the number is given to all of the stored pixels as shown in FIG. 18. Therefore, the number assigning process can quickly be completed as compared with a case in which the characteristic amount is repeatedly compared and numbers are assigned. As a result of the foregoing number assigning process, an area sectioned into regions corresponding to the portions of the eye can be obtained as shown in FIG. 6.

In step 106, the shape, the (positional) relationship with other regions, the surface area ratio, the density and the average color tone of each of the regions obtained by the sectioning process performed in step 104 are checked. Among the regions, the region apparently having the characteristic which is the most similar to that of a pupil portion is selected as the red-eye region. If two or more regions in the image of one eye are selected as red-eye regions, the shape, the (positional) relationship with the other regions, the surface area ratio, the density and the average color tone of each of these regions are evaluated. Then, a region judged on the basis of the evaluation to have the highest possibility of being a red-eye region is selected as the red-eye region.

For example, the evaluation may be performed such that a first mark (i.e., a grade or a score) is given to each sectioned region, the first mark increasing as the degree of roundness increases. The region having the highest mark is the region apparently having the characteristic most similar to that of a pupil portion. That is, this region is determined to be the red-eye region. Another method may be employed in which the distance between the position of the center of gravity and the central position of a designated region is calculated for each sectioned region to obtain a second mark which increases as the aforementioned distance decreases. The region having the highest mark is the region apparently having a characteristic which is the most similar to that of a pupil portion, and is made to be the red-eye region.

Another method may be employed in which a ratio of the surface area of the sectioned region and the surface area of a designated region is obtained for each sectioned region. A third mark is given which decreases the more the obtained ratio deviates from a predetermined range of the ratio of the surface area of a pupil and the surface area of the designated region. The region having the highest mark is used as the region apparently having the characteristic the most similar to that of a pupil portion, and this region is used as the red-eye region.

Another method may be employed in which any one of an average value, a maximum value, a minimum value, contrast and histogram shape of any one of the hue, saturation and lightness is used. A comparison with satistical information about regions having discoloration which have been measured is performed so as to obtain a fourth mark. This fourth mark increases as the characteristic becomes color to the characteristic of discoloration regions. The region having the highest mark is the region apparently having a characteristic which is the most similar to that of a pupil portion, that is, a red-eye region.

A fifth mark is obtained in accordance with a pre-designated central position of the pupil and the distance between the eye. The further from the center of the pupil, the lower the fifth mark. The region having the highest mark is the region apparently having the characteristic the most similar to that of a pupil portion, that is, a red-eye region. The pupil portion has the highest fifth mark and the fifth mark decreases as the position moves apart from the pupil as shown in FIG. 19B which shows the marks at the dashed lines of FIG. 19A.

At least one mark is selected from the five marks. The red-eye region may be determined in accordance with the mark. It is preferable that an average value or a weighted average value of two or more marks of the five marks is used to determine the top L (L is not smaller than one) regions as discoloration regions.

For example, when the region is sectioned into six areas (sectioned regions) as shown in FIG. 20, let us assume as shown in FIG. 20A that the first mark is A4 for area 1, A6 for area 2, A2 for area 3, A3 for area 4, A1 for area 5 and A5 for area 6. Let us also assume that the second mark is B5 for area 1, B4 for area 2, B2 for area 3, B3 for area 4, B1 for area 5 and B6 for area 6. Further, $$A1>A2>A3>A4>A5>A6 \quad (2)$$

$$B1>B2>B3>B4>B5>B6 \quad (3)$$

Then, the average value of the first mark and the second mark for each region is calculated. As shown in FIG. 20B, the area 1 has a mark of (A4+B5)/2, the area 2 has a mark of (A6+B4)/2, the area 3 has a mark of (A2+B2)/2, the area 4 has a mark of (A3+B3)/2, the area 5 has a mark of (A1+B1)/2 and the area 6 has a mark of (A5+B6)/2. As can be understood from equations (2) and (3), the area 5 has the highest mark.

When a weighted average is calculated such that weights are applied to the order of the marks, the high mark is further raised and the low mark is further lowered. Therefore, the difference in the marks is increased. Thus, the portion apparently having the characteristic the most similar to that of the pupil portion can clearly be distinguished.

In step 108, pixels in the thus-selected red-eye region are corrected such that the lightness of all of the pixels are made to be the same as or close to the lightness of the pixel having the lowest lightness, in accordance with the lightness of the pixel having the lowest lightness in the red-eye region. Given that the lightness of the pixel having the lowest lightness among the pixels in the red-eye region is dmin and the lightness of a pixel in the red-eye region which is to be corrected is x, the corrected lightness x' of the pixel in the red-eye region to be corrected is calculated in accordance with the following equation (4):

$$x'=x-(x-d\text{min})\times a \quad (4)$$

If the value a satisfies 1≦a≦1.3, the corrected image can be made to have a natural feeling, and thus values of a within this range are preferred. The pupil portion which was a red-eye becomes, after correction, an image having a lightness which gradually decreases from the peripheral portion to the central portion.

Figure 7A:
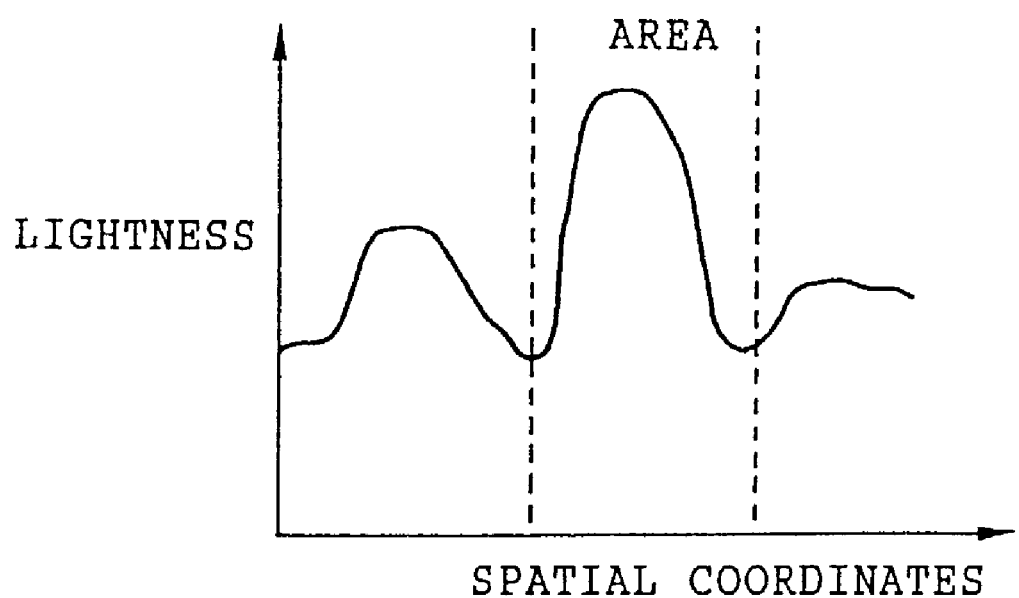
FIG. 7A is a graph showing lightness distributed along a lengthwise line passing through the corners of an eye.
Figure 7B:
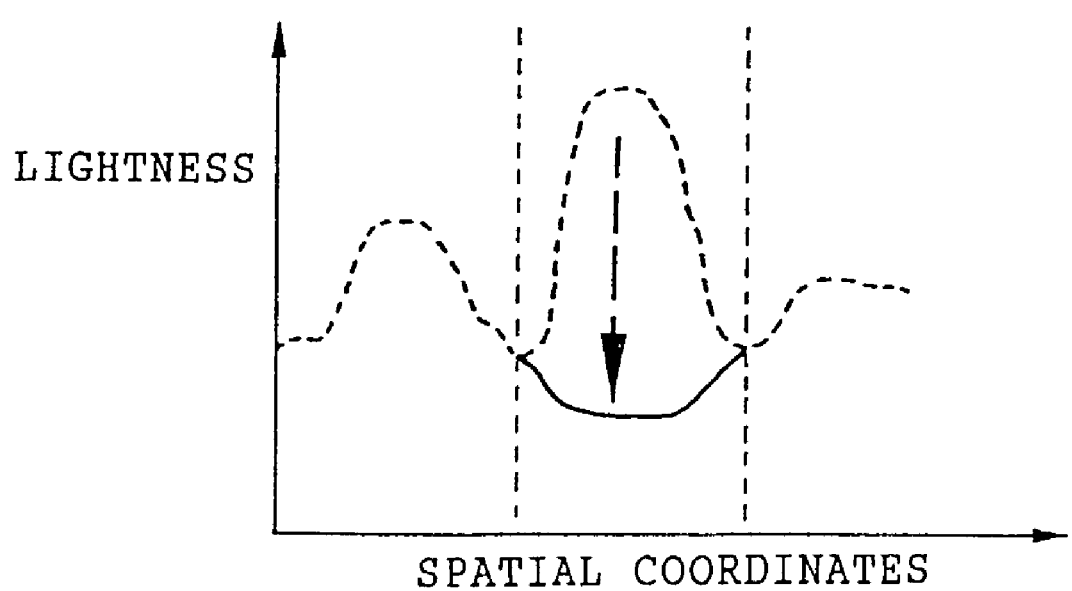
FIG. 7B is a graph showing a state of corrected lightness of the red-eye region shown in FIG. 7A in accordance with equation (2) when a=1.3.

As an example of correction, FIG. 7A shows the lightness, before correction, along a line passing through the corner of the eye, and FIG. 7B shows the lightness along the same line after the correction.

Also, the saturation is corrected similarly to the method of correcting the lightness such that the saturation is made to be the same as or close to the saturation of the pixel having the lowest saturation. If a finished print having a natural feeling is to be formed, it suffices to correct only the lightness or the saturation. Note that the amount of correction of the characteristic amount may be determined in advance to meet the requirements of the user. In this case, a special tone desired by the user may be realized.

Another correction method may be employed in which a radial gradation pattern formed outwardly from the center of the corrected red-eye region is used. The gradation pattern is colored in a designated color such that the density decreases from the center to the periphery. The designated color may be a highest density and a lowest density detected from the pupil portion of another region free from red-eye, or a highest density and a lowest density adjusted from the previously-mentioned highest density and lowest density, or a highest density and a lowest density determined in advance by the user. Since processing methods for applying the gradation pattern are known techniques, description thereof shall be omitted.

When dmin in equation (4) or the highest density and the lowest density for controlling the gradation pattern are determined, the area within the red-eye region, the area within a designated region of the eye, the area within the face region, or the overall image may be used as the region for comparison.

In step 110, a partial high luminance region in the corrected red-eye region, that is, a highlight region, is formed and this is used as a position of catch light. The position of the catch light is the position at which the highest lightness is detected in the red-eye region before correction. On the basis of this position of the highest lightness, bright spots positioned radially are formed.

For example, given that the lightness of the pixel having the lowest lightness among the pixels in the red-eye region is dmin, the adjustment coefficient of the lightness is k and the lightness of the pixel at a position of the red-eye region to be corrected is y (i, j), then the lightness y' (i, j) of the pixel at the position of the catch light in the red-eye region can be calculated by the following equation (5):

$$y'(i, j) = dmin + k(i, j) \times \{y(i, j) - dmin\} \quad (5)$$

where i and j indicate the position of the catch light. Since the lightness of the pixels forming the catch light portion gradually decreases from the center, the lightness adjustment coefficient k in the table shown in FIG. 8 is set. Then, the lightness adjustment coefficient k (i, j) is changed to correspond to the position (i, j) of the catch light.

By setting the size of the catch light portion and the lightness adjustment coefficient to correspond to the size of the image of the red-eye region to be corrected, a pupil image having an even more natural feeling can be formed.

In the present embodiment, the catch light portion is formed by changing the lightness of each pixel in accordance with which position of the catch light portion the pixel corresponds to. However, another structure may be employed in which a catch light pattern is formed in advance and pasted to the position of the catch light. In this case as well, because the size of the catch light portion can be freely enlarged/reduced to correspond to the size of the image of the red-eye region to be corrected, a pupil image having an even more natural feeling can be formed. Of course, a pupil image having a more natural feeling can also be formed by similarly permitting arbitrary setting of the lightness.

FIG. 9 is a graph showing the lightness, along a lengthwise line which passes through the corners of the eye, of an image in which a catch light pattern is formed obtained by correcting the red-eye.

In the present embodiment, each of steps 102 to 106 is performed once for the same designated region. However, steps 102 to 106 may be repeated plural times to more accurately extract the red-eye region.

The present invention is not limited to the above-described structure. Adjacent regions obtained by sectioning may be connected to one another and subjected to red-eye evaluation. For example, when the original red-eye portion is sectioned into two regions, the regions each containing the red-eye portion are connected to each other to form one region to be recognized. Thus, the evaluation of the degree of roundness can be improved. If the evaluation of the connected regions is superior to that of each of the sectioned regions, the connected regions are determined to be the red-eye region.

The extraction of the red-eye, the correction of the red-eye region, the addition of the catch light, and the like may independently be performed. Therefore, another method or a manual process may be substituted for any of these processes so as to combine processes arbitrarily when the red-eye correction process is performed.

A correction process may be performed in which a normal pupil is enlarged or reduced and pasted to the extracted red-eye region. In this case, it is preferable that, after the eye has been pasted, further correction is performed in an attempt to achieve matching with the overall region.

With reference to the drawings, an embodiment of the image processing method according to the present invention will now be described.

FIG. 11 is a schematic view showing the embodiment of the digital photographic system according to the present invention. A digital photographic system 310 shown in the drawing basically incorporates a scanner (an image reading device) 312 for photoelectrically reading each frame of images photographed on a film F; an image processing device 314 for processing input image data while controlling the overall operation of the digital photographic system 310; and an image recording device 316 for exposing a photosensitive material to light in accordance with processed image data so as to develop the photosensitive material.

FIG. 11 shows an input section 318 having a keyboard 318a and a mouse 318b for inputting (setting) various conditions, selecting and instructing processes and instructing color/density correction; and a display section 320, such as a CRT or an LCD, for displaying, for example, the image read by the scanner 312, instructions of various operations and a window for setting/registering conditions. The input section 318 and the display section 320 are connected to a control section (not shown) of the image processing device 314.

In the scanner 312, the quantity of reading light emitted from, for example, a light source, is adjusted by a variable diaphragm, and then uniformly diffused into a direction of the surface of the film F by a diffusing box. Then, reading light is allowed to pass through a slit of a mask for controlling reading light which is made incident on the film F, the slit being extended in the fine scanning direction (the widthwise direction of the film F). Thus, reading light is made incident on the film F which is being moved in the sub-scanning direction (the lengthwise direction of the film F). As a result, the film F is two-dimensionally scanned with reading light made incident through the slit of the mask.

Since reading light is allowed to pass through the film F, projected light having the image photographed on the film F is focused on the light receiving surface of three line CCD sensors of an image sensor for reading RGB (Red, Green and Blue) images so as to be decomposed into three primary colors RGB and photoelectrically read by the image sensor. Then, image data read by the image sensor is amplified by an amplifier, and then converted into a digital signal by an A/D converter. Then, the digital signal is supplied to the image processing device 314.

The scanner 312 performs prescan whereby the image photographed on the film F is read at a low resolution and performs fine scan whereby the same is read at a high resolution. As described later, the image processing device 314 sets reading conditions and image processing conditions in accordance with image data obtained from the prescanning operation. The image processing conditions are used to process image data obtained from the fine scanning operation. The prescan and the fine scan are different from each other in the resolution for reading the image.

The original image and the source for supplying the original image of the digital photographic system 310 according to the present invention are not limited to the scanner 312 which reads the image of a translucent original, for example, a variety of photographic films. For example, the source may be a scanner for reading a reflected original, such as a variety of photographic prints, an image pickup device, such as a digital still camera or a digital video camera, computer communication, such as Internet or a Local Area Network and a recording medium (means for recording/reading a medium) such as an MO disk.

As described above, RGB digital signals are output from the scanner 312 to the image processing device 314 (hereinafter called a "processing device 314").

FIG. 12 is a block diagram showing an embodiment of the processing device 314. The processing device 314 incorporates a data processing section 322, a log converter 324, a prescan (frame) memory 326, a fine scan (frame) memory 328, a prescan processing section 330, a main-scan processing section 332 and a condition setting section 334.

To simplify the description, FIG. 12 shows only sections for use in the image processing operation. Similarly to, for example, a personal computer, the processing device 314 incorporates a control section for totally controlling/administrating the digital photographic system 310, which includes the processing device 314, through the input section 318 and the display section 320.

The RGB digital signals supplied from the scanner 312 to the processing device 314 are, in the data processing section 322, subjected to predetermined data processing including a dark state correction, a defective pixel correction and a shading correction. Then, the digital signals are log-converted by the log converter 324 so as to be converted into density data. When the prescanning operation is performed, density data is stored in the prescan memory 326 as prescan data. When the fine scanning operation is performed, density data is stored in the fine scan memory 328 as fine scan data.

Prescan data stored in the prescan memory 326 is read by the prescan processing section 330, while fine scan data stored in the fine scan memory 328 is read by the main-scan processing section 332. Read data is processed by the corresponding processing sections.

The prescan processing section 330 incorporates an image data processing section 336 and an image data converting section 338, while the main-scan processing section 332 incorporates an image data processing section 340 and an image data converting section 342.

The processing section 336 of the prescan processing section 330 and the processing section 340 of the main-scan processing section 332 are sections for subjecting the image (image data) read by the scanner 312 to predetermined image processings under the processing conditions set by the condition setting section 334 to be described later. The processing sections 336 and 340 basically perform the same processes except for the difference in the resolution. Note that the two processing sections 336 and 340 perform a variety of known image processings including, for example, the red-eye correction processing.

The image processings include the red-eye correction processing, gray balance adjustment, gradation correction and density (brightness) adjustment each using a lookup table (LUT), correction of a light source for use in a photographing operation and saturation adjustment (color adjustment) using a matrix (MTX), an averaging processing by arbitrarily combining a low-pass filter, an adder, an LUT and an MTX, an electronic magnification varying processing which is performed by carrying out an interpolating processing, a dodging process (compression/expansion of the dynamic range of the density) and a sharpness (sharpening) processing.

FIG. 13 is a schematic view showing an embodiment of a red-eye correction process of the image processing method according to the present invention.

A request for producing prints is performed when a request for developing the film F is performed (simultaneous printing) in a case of images photographed on the film F. As an alternative to this, a request (of re-print) is performed with a developed film F, that is, an elongated roll film F or a piece film F sectioned to have four or five frames.

A portion of the images of one film F requested to be printed includes images of certain frames which include the red-eye phenomenon in spite of original dark eyes included in the other images of other frames. In this case, an operator performs an operation according to the present invention. That is, the operator selects, from the plural images, images (red-eye images) in the red-eye state to be corrected and images (reference images) including dark eyes which are characteristic portions corresponding to the red-eye portions to be corrected.

It is preferable that the red-eye images and reference images are displayed such that a list of frame images of a plurality of pre-scan images are displayed on the display section 320 comprising the CRT or the like. Moreover, the operator instructs the frame number among the displayed list of the plural frame images by using the keyboard 318a. As an alternative to this, the operator uses the mouse 318b or the like to designate the frame image to visually select the images while confirming the images enlarged and displayed on the display section 320. The red-eye images and reference images selected by the operator are displayed on the display section 320.

Then, the operator uses the mouse 318b or the like to designate regions including the red-eye images and the regions including the dark eye regions which are the characteristic portions of the reference images and displayed on the display section 320. In this embodiment, regions including the two eyes may simultaneously be designated or each eye may sequentially be designated. Red-eye regions and dark eye regions are detected from the designated regions by the two processing sections 336 and 340.

Then, the two processing sections 336 and 340, for example, enlarge/reduce (vary the magnification) the dark eyes detected from the reference image to paste the dark eyes to the red-eye regions. As an alternative to this, only the red-eye regions except for catch light portions are filled with image data of the dark eyes. Thus, the red-eye is corrected with information about the dark eye of the photographed person. Thus, the image processing method according to the present invention corrects the red-eye by using the dark eye of the photographed person. Therefore, the red-eye can naturally be corrected while the catch light portion is being maintained.

It is preferable that the red-eye image to be corrected, the reference image which is the selected image and the image after correcting(corrected image) are arranged and displayed on the display section 320, as shown in FIG. 14. Since the red-eye image, the reference image and the corrected image are arranged and displayed on the display section 320 at the same time, the operator is able to compare the images with one another to confirm a result of the corrected image. For example, re-correction of the red-eye is permitted.

The image processing method according to the present invention is not limited to the red-eye correction. For example, the present invention may be applied to correct wrinkles, blotches, freckles, pimples, scars, and burn marks. The present invention is not limited to process of the image of a person. The images of one film requested to produce a print is not limited to the translucent original of images photographed on the film F or the like. The images may, of course, be those of a reflected original, such as a photographic print, or digital image data supplied from a digital camera or a computer. Moreover, the correction method is not limited.

As an alternative to selection of the reference image from a plurality of image of one medium, the reference image may be selected from another medium. If only either eye of the image of the person to be corrected is the red-eye, another eye of the same person may be employed as the reference image. If both of the eyes are red-eyes, the eyes of another person photographed on the same frame may be employed as the reference image. As an alternative to this, the eyes of the person which are not red-eyes in another frame (image) or the eyes of another person may be employed as the reference image. Any images of the eyes, which are not the red-eyes, may be employed as the reference image. When the reference image is employed from a similar scene or the same medium, the portion, such as the red-eye, to be corrected can furthermore accurately be corrected. When the red-eye is corrected, it is preferable that attention is paid to the size, shape and the direction of the eyes when the reference image is employed.

If necessary, the image data converting section 338 of the prescan processing section 330 thins image data processed by the image data processing section 336. Then, the image data converting section 338 uses, for example, a 3D (three dimensional)-LUT, to convert image data into image data to be displayed on the display section 320 so as to supply image data to be displayed to the display section 320. Similarly, the image data converting section 342 of the main-scan processing section 332 uses the 3D-LUT or the like to convert image data processed by the image data processing section 340 into image data which must be recorded by the image recording device 316 so as to supply image data to the image recording device 316.

Then, the condition setting section 334 of the processing device 314 sets various processing conditions under which the prescan processing section 330 and the main-scan processing section 332 perform the corresponding operations and reading conditions under which the fine scanning operation is performed. The condition setting section 334 incorporates a set-up section 344, a key correction section 346 and a parameter integration section 348.

The set-up section 344 of the condition setting section 334 produces density histogram from prescan data and calculates image characteristic amount, such as the average density, highlight (a lowest density), shadow (a highest density) and the like to determine the reading conditions for the fine scan. In accordance with an instruction which is issued from the operator if necessary, the set-up section 344 produces the LUT with which the gray balance adjustment, the density adjustment and the gradation correction are performed, produces an equation for calculating the MTX and calculates the coefficient for correcting the sharpness. Thus, the set-up section 344 sets various processing conditions for the prescan processing section 330 and the main-scan processing section 332.

In accordance with various instructions input from the input section 318, such as keys for adjusting density (the brightness), color, contrast, sharpness and saturation previously assigned to the keyboard 318a and the mouse 318b, the key correction section 346 calculates a quantity of adjustment of the image processing conditions so as to communicate the quantity to the parameter integration section 348.

The parameter integration section 348 receives the image processing conditions set by the set-up section 344 to set the same to the prescan processing section 330 and the main-scan processing section 332. In accordance with the quantity of adjustment calculated by the key correction section 346, the parameter integration section 348 corrects (adjusts) the image processing conditions set for each section.

The operation of the digital photographic system 310 will schematically be described.

When start of production of a print of the film F has been instructed, the scanner 312 starts prescanning. Thus, each image photographed on the film F is decomposed into RGB so as to photoelectrically be read and converted into a digital signal. The RGB digital signal output from the scanner 312 is supplied to the processing device 314 so as to be subjected to predetermined data processings. Then, the digital signal is log-converted so as to be converted into density data, and then stored in the prescan memory 326.

Then, prescan data is read from the prescan memory 326 so as to be supplied to the set-up section 344 of the condition setting section 334 and the image data processing section 336 of the prescan processing section 330.

The set-up section 344 produces from the prescan data the density histogram of the image and calculates the image characteristic amount so as to decide the reading conditions for the fine scanning operation. In accordance with the density histogram, the image characteristic amount and an instruction which is issued from the operator if necessary, the set-up section 344 decides various image processing conditions (the exposure conditions) for the processing sections 336 and 340 so as to communicate the same to the parameter integration section 348. The parameter integration section 348 sets the image processing conditions to predetermined portions in the prescan processing section 330 and the main-scan processing section 332.

Prescan data is, in the processing section 336, subjected to the various image processings including the red-eye correction processing, and then converted image data to be displayed by the image data converting section 338. As shown in FIG. 14, the reference image, the red-eye image and the corrected image are arranged and displayed on the display section 320. The operator observes the images displayed on the display section 320 to evaluate the corrected image subjected to the red-eye correction processing and confirms (examines) results of the processes. If necessary, the operator uses the adjustment key or the like provided for the keyboard 318a to adjust the color, density and the gradation.

If the operator determines that the corrected image is an unsatisfactory image, the red-eye correction processing may again be performed. If the operator determines that the corrected image is a satisfactory image, the operator inputs adjustment of the color, the density and the gradation to the key correction section 346. Thus, a quantity of correction of the image processing conditions corresponding to the input adjustment is calculated so as to be communicated to the parameter integration section 348. The parameter integration section 348 receives the quantity of correction communicated from the key correction section 346 so as to correct the LUT and the MTX of the processing sections 336 and 340. To correspond to the correction, that is, the input adjustment by the operator, the images displayed on the display section 320 are changed.

If the operator determines that the frame images subjected to the image processings including the red-eye correction processing are satisfactory images (satisfactorily examined), the operator uses the keyboard 318a and/or the mouse 318b to instruct start of the printing operation. Thus, the image processing conditions are decided and the reading conditions for the fine scanning conditions are set to the scanner 312. As a result, the fine scanning operation is started. If the examination is not performed, the image processing conditions are decided when the image processing conditions have been set to the main-scan processing section 332 by the parameter integaration section 348. Then, the fine scanning operation is started.

The fine scanning operation is performed similar to the prescanning operation except for the reading conditions for the fine scanning conditions. Fine scan data is stored in the fine scan memory 328.

Then, fine scan data is read from the fine scan memory 328 so as to be supplied to the processing section 340 of the main-scan processing section 332. The image data processing section 340 subjects fine scan data to the various processings including the red-eye correction processing under the decided image processing conditions. The image data converting section 342 converts fine scan data into image data to be output, and then image data to be output is supplied to the image recording device 316.

Basically, the image recording device 316 incorporates a printer (a printing device) for exposing the photosensitive material (photographic paper) and recording the latent image to light in accordance with supplied image data and a processor (a developing device) for subjecting the exposed photosensitive material to a predetermined processing so as to output image data as a print.

The printer cuts the photosensitive material to have a predetermined length corresponding to the required print. Then, the printer records a backprint. In the printer, three types of light beams for exposure of red components, that of green components and that of blue components corresponding to the spectral sensitivity characteristics of the photosensitive material are modulated in accordance with image data output from the processing device 314 so as to deflect the light beams into the fine scanning direction. Moreover, the photosensitive material is moved in the sub-scanning direction perpendicular to the fine scanning direction. Thus, the photosensitive material is two-dimensionally scanned and exposed with the laser beam so that a latent image is recorded which is supplied to the processor.

The processor which has received the photosensitive material subjects the photosensitive material to predetermined wet processings including the color development processing, bleaching for fixation and water washing, and then dries the photosensitive material so that the prints are produced. Then, the prints are sectioned into a predetermined unit, such as one roll of a film, so that the prints are accumulated.

As described above, according to the first to third aspects of the present invention, an effect can be obtained in that the area of any image can accurately be sectioned to select only the area to be corrected.

According to the fourth and fifth aspects of the present invention, an effect can be obtained in that only the pupil region can accurately be selected.

According to the sixth to twentieth aspects of the present invention, an effect can be obtained in that the pupil region, to be corrected, can accurately be corrected.

According to the twenty-first aspect of the present invention, an effect can be obtained in that a corrected image can be formed into a natural image.

According to the twenty-second aspect of the present invention, an effect can be obtained in that the red-eye correction processing can accurately be performed.

As described above, the image processing method according the twenty-third aspect of the present invention comprises the steps of: selecting an image which is to be corrected, and an image including a characteristic portion corresponding to a portion to be corrected of the image to be corrected; designating a region including the portion to be corrected of the image to be corrected, and a region including the characteristic portion of the selected image; and using the characteristic portion of the selected image to correct the portion to be corrected of the image to be corrected.

The image processing method according to the present invention uses the image of the dark eye of the photographing person to correct the image of the red-eye. Therefore, correction of the image to be corrected including at least correction of red-eye, wrinkles, blotches, freckles, pimples, scars, and burn marks can naturally be performed.

The image processing method according to the present invention is structured as described above. The present invention is not limited to the foregoing embodiments. As a matter of course, the present invention may be corrected variously within the scope of the present invention.

What is claimed is:

1. An image processing method applied to a digital photographic system for making a photographic print by subjecting digital image data to image processing, said image processing method comprising the steps of:

selecting a first image which is to be corrected, and a second image including a characteristic portion corresponding to a portion to be corrected of the first image, said characteristic portion is a substantially fixed reference portion that differs from the portion to be corrected of the first image;

designating a first region including the portion to be corrected of the first image, and a second region including the characteristic portion of the selected second image; and using the second region including the characteristic portion of the second image to correct the first region including the portion to be corrected of the first image.

2. An image processing method according to claim 1, wherein when the first image is corrected, the first image, the second image including the characteristic portion, and a corrected image are displayed together on an image display portion of the digital photographic system.

3. An image processing method according to claim 1, wherein correction of the first image includes correction of at least one of red-eye, wrinkles, blotches, freckles, pimples, scars, and bum marks.

4. An image processing method according to claim 1, wherein said correction of the first image comprises varying the magnification of the second region including the characteristic portion, and pasting the second region to the first region including the portion to be corrected.

5. An image processing method according to claim 1, wherein said correction of the first image comprises filling the portion to be corrected with the characteristic portion.

6. An image processing method applied to a digital photographic system for making a photographic print by subjecting digital image data to image processing, said image processing method comprising the steps of:

selecting a first image which is to be corrected, and a second image including a characteristic portion corresponding to a portion to be corrected of the first image;

designating a first region including the portion to be corrected of the first image, and a second region including the characteristic portion of the selected second image; and using the second region including the characteristic portion of the second image to correct the first region including the portion to be corrected of the first image, wherein the first image and the second image are identical, and the first region and the second region are different regions included in the same image.

7. An image processing method according to claim 6, wherein when the first image is corrected, the first image, the second image including the characteristic portion, and a corrected image are displayed together on an image display portion of the digital photographic system.

8. An image processing method according to claim 6, wherein correction of the first image includes correction of at least one of red-eye, wrinkles, blotches, freckles, pimples, scars, and bum marks.

9. An image processing method according to claim 6, wherein said correction of the first image comprises varying the magnification of the second region including the characteristic portion, and pasting the second region to the first region including the portion to be corrected.

10. An image processing method according to claim 6, wherein said correction of the first image comprises filling the portion to be corrected with the characteristic portion.

11. An image processing method applied to a digital photographic system for making a photographic print by subjecting digital image data to image processing, said image processing method comprising the steps of:

selecting a first image which is to be corrected, and a second image including a characteristic portion corresponding to a portion to be corrected of the first image;

designating a first region including the portion to be corrected of the first image, and a second region including the characteristic portion of the selected second image; and using the second region including the characteristic portion of the second image to correct the first region including the portion to be corrected of the first image, wherein the first image and the second image are separate images, and each image includes the first region and the second region respectively.

12. An image processing method according to claim 11, wherein when the first image is corrected, the first image, the second image including the characteristic portion, and a corrected image are displayed together on an image display portion of the digital photographic system.

13. An image processing method according to claim 11, wherein correction of the first image includes correction of at least one of red-eye, wrinkles, blotches, freckles, pimples, scars, and bum marks.

14. An image processing method according to claim 11, wherein said correction of the first image comprises varying the magnification of the second region including the characteristic portion, and pasting the second region to the first region including the portion to be corrected.

15. An image processing method according to claim 11, wherein said correction of the first image comprises filling the portion to be corrected with the characteristic portion.

* * * * *